(12) United States Patent
Roll et al.

(10) Patent No.: US 10,713,728 B1
(45) Date of Patent: Jul. 14, 2020

(54) RISK MITIGATION FOR AFFINITY GROUPINGS

(71) Applicant: STATE FARM MUTUAL AUTOMOBILE INSURANCE COMPANY, Bloomington, IL (US)

(72) Inventors: Leif Agerholm Roll, Bloomington, IL (US); Craig Dean Isaacs, Bloomington, IL (US); Eric Webster, Bloomington, IL (US); Gregory L. Hayward, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 65 days.

(21) Appl. No.: 15/869,685

(22) Filed: Jan. 12, 2018

Related U.S. Application Data

(63) Continuation-in-part of application No. 14/871,401, filed on Sep. 30, 2015, now Pat. No. 10,510,120.
(Continued)

(51) Int. Cl.
  *G06Q 40/06* (2012.01)
  *G06Q 40/08* (2012.01)
  (Continued)

(52) U.S. Cl.
  CPC .............. *G06Q 40/08* (2013.01); *G06Q 10/10* (2013.01); *G06Q 30/08* (2013.01); *G06Q 40/06* (2013.01)

(58) Field of Classification Search
  CPC ........ G06Q 10/00; G06Q 20/00; G06Q 30/00; G06Q 40/00
  (Continued)

(56) References Cited

U.S. PATENT DOCUMENTS

| 5,794,207 A | 8/1998 | Walker et al. |
| 5,797,134 A | 8/1998 | McMillan et al. |

(Continued)

OTHER PUBLICATIONS

Douglass, "Auction Rate Securities"..Going Once, Going Twidce, New Jersey CPA, Nov.-Dec. (Year: 2010).*
(Continued)

*Primary Examiner* — Frantzy Poinvil
(74) *Attorney, Agent, or Firm* — Marshall, Gerstein & Borun LLP

(57) ABSTRACT

Multiple insurance policies may be grouped or segmented into affinity groups, each of which corresponds to a respective risk level. A set of financial instruments corresponding to a particular affinity group of insurance policies may be created and automatically offered for auction, e.g., online. Bids received from potential investors may indicate, e.g., percentage of assumed risk, percentage of profit sharing, percentage of shared loss, service or commission fee amounts, etc. that are acceptable to the bidding party. The party or parties submitting the winning bids may be awarded investment in the financial instruments and may enter into respective financial agreements with the financial instrument provider, thereby securitizing the risk associated with the insurance policies. Profits and/or losses generated by the insurance policies of the affinity group corresponding to the financial instruments may be distributed in accordance with the terms of the financial agreement.

20 Claims, 6 Drawing Sheets

Related U.S. Application Data

(60) Provisional application No. 62/593,727, filed on Dec. 1, 2017, provisional application No. 62/551,818, filed on Aug. 29, 2017, provisional application No. 62/503,184, filed on May 8, 2017, provisional application No. 62/485,725, filed on Apr. 14, 2017, provisional application No. 62/471,224, filed on Mar. 14, 2017, provisional application No. 62/199,008, filed on Jul. 30, 2015, provisional application No. 62/189,885, filed on Jul. 8, 2015, provisional application No. 62/104,596, filed on Jan. 16, 2015, provisional application No. 62/060,080, filed on Oct. 6, 2014.

(51) Int. Cl.
*G06Q 30/08* (2012.01)
*G06Q 10/10* (2012.01)

(58) Field of Classification Search
USPC .................................................. 705/3–44
See application file for complete search history.

(56) References Cited

U.S. PATENT DOCUMENTS

| | | | |
|---|---|---|---|
| 6,085,169 A | 7/2000 | Walker et al. | |
| 6,101,484 A | 8/2000 | Halbert et al. | |
| 6,418,415 B1 | 7/2002 | Walker et al. | |
| 7,107,230 B1 | 9/2006 | Halbert et al. | |
| 7,194,427 B1 | 3/2007 | Van Horn et al. | |
| 7,330,826 B1 | 2/2008 | Porat et al. | |
| 7,403,911 B2 | 7/2008 | Guler et al. | |
| 7,558,752 B1* | 7/2009 | Ephrati | G06Q 30/08 705/37 |
| 7,584,124 B2 | 9/2009 | Porat et al. | |
| 7,720,743 B1 | 5/2010 | Marks | |
| 7,797,194 B1 | 9/2010 | Friss et al. | |
| 7,904,378 B2 | 3/2011 | Ghani et al. | |
| 7,958,013 B2 | 6/2011 | Porat et al. | |
| 7,979,341 B2 | 7/2011 | Hanifi | |
| 7,996,296 B2 | 8/2011 | Lange | |
| 8,068,475 B2* | 11/2011 | Iochi | H04W 28/22 370/332 |
| 8,103,577 B2* | 1/2012 | Sakaue | G06Q 30/08 705/37 |
| 8,117,112 B2 | 2/2012 | Hambrecht et al. | |
| 8,190,454 B2 | 5/2012 | Chien et al. | |
| 8,251,702 B2 | 8/2012 | Marks | |
| 8,296,191 B1 | 10/2012 | Foo et al. | |
| 8,306,869 B2* | 11/2012 | Ford | G06Q 30/0601 705/26.4 |
| 8,315,891 B2* | 11/2012 | Kendall | G06Q 40/08 705/4 |
| 8,332,244 B1 | 12/2012 | Karam et al. | |
| 8,341,033 B2 | 12/2012 | Porat et al. | |
| 8,515,777 B1 | 8/2013 | Rajasenan | |
| 8,527,302 B2 | 9/2013 | Johnson, Jr. et al. | |
| 8,545,229 B2 | 10/2013 | Marks | |
| 8,612,266 B1 | 12/2013 | Ilgenfritz | |
| 8,666,786 B1 | 3/2014 | Wirz et al. | |
| 8,719,063 B1 | 5/2014 | Wade et al. | |
| 8,738,463 B2 | 5/2014 | Porat et al. | |
| 8,744,881 B2* | 6/2014 | Reid | G06Q 30/06 705/35 |
| 9,972,053 B2 | 5/2018 | Denning et al. | |
| 9,996,884 B2 | 6/2018 | Collopy et al. | |
| 10,062,118 B1 | 8/2018 | Bernstein et al. | |
| 10,510,120 B1 | 12/2019 | Roll | |
| 2001/0004204 A1 | 6/2001 | Mitsuaki | |
| 2001/0037281 A1 | 11/2001 | French et al. | |
| 2001/0042041 A1 | 11/2001 | Moshal et al. | |
| 2002/0029158 A1 | 3/2002 | Wolff et al. | |
| 2002/0042769 A1 | 4/2002 | Gujral et al. | |
| 2002/0046067 A1 | 4/2002 | Kraehenbuehl et al. | |
| 2002/0111835 A1 | 8/2002 | Hele et al. | |
| 2002/0194033 A1 | 12/2002 | Huff | |
| 2003/0023492 A1 | 1/2003 | Riordan et al. | |
| 2003/0050901 A1 | 3/2003 | Jester et al. | |
| 2003/0069759 A1 | 4/2003 | Smith | |
| 2003/0182222 A1 | 9/2003 | Rotman et al. | |
| 2003/0191672 A1 | 10/2003 | Kendall et al. | |
| 2003/0233260 A1 | 12/2003 | Snell et al. | |
| 2004/0186755 A1 | 9/2004 | Roche | |
| 2005/0055299 A1 | 3/2005 | Chambers et al. | |
| 2005/0075910 A1 | 4/2005 | Solankl et al. | |
| 2005/0119580 A1 | 6/2005 | Eveland | |
| 2005/0199580 A1 | 9/2005 | Yang et al. | |
| 2005/0278199 A1 | 12/2005 | Ghani | |
| 2006/0017897 A1 | 1/2006 | Sato | |
| 2006/0055037 A1* | 3/2006 | Park | H01L 24/11 257/737 |
| 2006/0178979 A1 | 8/2006 | Levine et al. | |
| 2006/0241982 A1 | 10/2006 | Seifert et al. | |
| 2007/0288262 A1 | 12/2007 | Sakaue et al. | |
| 2008/0052111 A1 | 2/2008 | McMenimen et al. | |
| 2008/0154694 A1 | 6/2008 | Litzow et al. | |
| 2009/0024419 A1 | 1/2009 | McClellan et al. | |
| 2009/0037228 A1 | 2/2009 | Engel | |
| 2009/0099877 A1 | 4/2009 | Hyde et al. | |
| 2009/0254971 A1 | 10/2009 | Herz et al. | |
| 2010/0014573 A1 | 1/2010 | Momtaz et al. | |
| 2010/0145735 A1 | 6/2010 | Kendall et al. | |
| 2010/0198658 A1 | 8/2010 | Marks | |
| 2011/0016687 A1 | 1/2011 | Xia | |
| 2011/0021369 A1 | 1/2011 | Mhlanga et al. | |
| 2011/0161168 A1 | 6/2011 | Dubnicki | |
| 2011/0166875 A1 | 7/2011 | Hayter et al. | |
| 2011/0184250 A1 | 7/2011 | Schmidt et al. | |
| 2011/0213693 A1 | 9/2011 | Kendall et al. | |
| 2012/0016692 A1 | 1/2012 | Jenkins-Robbins | |
| 2012/0078698 A1 | 3/2012 | Pappas et al. | |
| 2012/0123891 A1 | 5/2012 | Patel | |
| 2012/0179481 A1 | 7/2012 | Patel et al. | |
| 2012/0209743 A1 | 8/2012 | Mesaros | |
| 2012/0232935 A1 | 9/2012 | Voccola | |
| 2012/0239438 A1 | 9/2012 | Hemmings et al. | |
| 2012/0278112 A1* | 11/2012 | Hersch | G06Q 40/00 705/4 |
| 2012/0323697 A1 | 12/2012 | Marks | |
| 2013/0066656 A1 | 3/2013 | Hanson et al. | |
| 2013/0090950 A1 | 4/2013 | Rao | |
| 2013/0096956 A1 | 4/2013 | Saidel et al. | |
| 2013/0117049 A1* | 5/2013 | Kendall | G06Q 30/02 705/4 |
| 2013/0151274 A1 | 6/2013 | Bage et al. | |
| 2013/0166313 A1 | 6/2013 | Kitfield et al. | |
| 2013/0179188 A1 | 7/2013 | Hyde et al. | |
| 2013/0304499 A1 | 11/2013 | Rangadass | |
| 2013/0328671 A1 | 12/2013 | McKown et al. | |
| 2013/0339065 A1 | 12/2013 | Dennin et al. | |
| 2014/0033243 A1 | 1/2014 | Chen et al. | |
| 2014/0058759 A1* | 2/2014 | Hersch | G06Q 40/00 705/4 |
| 2014/0081670 A1 | 3/2014 | Lim et al. | |
| 2014/0136237 A1 | 5/2014 | Anderson et al. | |
| 2014/0136443 A1 | 5/2014 | Kinsey, II et al. | |
| 2014/0172466 A1 | 6/2014 | Kemp et al. | |
| 2014/0188525 A1* | 7/2014 | Kendall | G06Q 40/00 705/4 |
| 2014/0222469 A1 | 8/2014 | Stahl et al. | |
| 2014/0244275 A1 | 8/2014 | Parthasarathy | |
| 2014/0278577 A1 | 9/2014 | Baum et al. | |
| 2014/0372151 A1 | 12/2014 | Karamchedu et al. | |
| 2015/0016173 A1 | 1/2015 | Liaw | |
| 2015/0066740 A1 | 3/2015 | DiCarlo | |
| 2015/0100437 A1 | 4/2015 | Guo et al. | |
| 2015/0134344 A1 | 5/2015 | Turrentine et al. | |
| 2015/0161738 A1 | 6/2015 | Stempora | |
| 2015/0170287 A1 | 6/2015 | Tirone et al. | |
| 2015/0172894 A1 | 6/2015 | Gabel | |
| 2015/0187019 A1 | 7/2015 | Fernandes et al. | |
| 2015/0278855 A1 | 10/2015 | Khoury | |

(56) References Cited

U.S. PATENT DOCUMENTS

| | | |
|---|---|---|
| 2015/0294420 A1 | 10/2015 | Hu |
| 2016/0034668 A1 | 2/2016 | Rourke et al. |
| 2016/0217532 A1 | 7/2016 | Slavin |
| 2016/0283987 A1* | 9/2016 | Nishimura .......... G06Q 30/0278 |
| 2016/0314524 A1* | 10/2016 | Trindade De Sousa Monteiro ..... G06Q 30/08 |

OTHER PUBLICATIONS

Flemming et al., Trading Activity and Price Transparency in the Inflation Swap Market, FRBNY Economic Policy Review May (Year: 2013).*
U.S. Appl. No. 14/868,864, Final Office Action, dated Nov. 16, 2018.
U.S. Appl. No. 14/868,864, Nonfinal Office Action, dated Jun. 11, 2018.
U.S. Appl. No. 14/868,864, Office Action, dated Jun. 11, 2018.
U.S. Appl. No. 14/868,874, Final Office Action, Apr. 23, 2019.
U.S. Appl. No. 14/868,874, Nonfinal Office Action, dated Jan. 9, 2019.
U.S. Appl. No. 14/871,170, Final Office Action, dated Apr. 19, 2019.
U.S. Appl. No. 14/871,170, Nonfinal Office Action, dated Sep. 20, 2018.
U.S. Appl. No. 14/871,170, Office Action, dated Sep. 20, 2018.
U.S. Appl. No. 14/871,230, Nonfinal Office Action, dated Jul. 12, 2018.
U.S. Appl. No. 14/871,230, Office Action, dated Jul. 12, 2018.
U.S. Appl. No. 14/871,273, Nonfinal Office Action, dated Apr. 3, 2019.
U.S. Appl. No. 14/871,273, Office Action, dated Aug. 15, 2018.
U.S. Appl. No. 14/871,273, Office Action, dated Feb. 9, 2018.
U.S. Appl. No. 14/871,306, Nonfinal Office Action, dated Apr. 1, 2019.
U.S. Appl. No. 14/871,306, Office Action, dated Aug. 16, 2018.
U.S. Appl. No. 14/871,306, Office Action, dated Dec. 5, 2018.
U.S. Appl. No. 14/871,341, office action, dated Jul. 10, 2018.
U.S. Appl. No. 14/871,401, Final Office Action, dated Jan. 15, 2019.
U.S. Appl. No. 14/871,401, Nonfinal Office Action, dated Jul. 26, 2018.
U.S. Appl. No. 15/457,705, Nonfinal Office Action, dated May 17, 2019.
U.S. Appl. No. 15/457,705, Roll et al., "System and Method for Obtaining and/or Maintaining Insurance Coverage", filed Mar. 13, 2017.
U.S. Appl. No. 15/704,339, Roll et al., "Systems and Methods for Obtaining and/or Maintaining Usage-Based Insurance", filed Sep. 14, 2017.
U.S. Appl. No. 15/704,340, Roll et al., "Systems and Methods for Obtaining and/or Maintaining Insurance for Autonomous Vehicles", filed Sep. 14, 2017.
U.S. Appl. No. 15/704,363, Roll et al., "Systems and Methods for Determining and Providing Insurance to Affinity Groups", filed Sep. 14, 2017.
U.S. Appl. No. 15/704,632, Roll et al., "Systems and Methods for Obtaining and/or Securing Insurance for Affinity Groups", filed Sep. 14, 2017.
U.S. Appl. No. 15/869,752, Roll et al., "Blockchain System and Methods for Providing Insurance to Affinity Groups", filed Jan. 12, 2018.
"Assessing the Risks of Insuring Reputation Risk", Gatzert et al., Journal of Risk and Insurance, vol. 83, No. 3, 641-679 (2016) (Year 2015).
"Free Diagnostics? $29 Service Call?", Greenleaf Mechanical, downloaded from the Internet at: <https://www.greenleafheatingandcooling.com/free-diagnostics-service/> (Jul. 29, 2012).
"Signing Bonus", Wikipedia entry, downloaded from the Internet at: <https://en.wikipedia.org/w/index.php?title=Signing_bonus@oldid=476735612> (2012).
U.S. Appl. No. 14/868,864, Final Office Action, dated Dec. 5, 2019.
U.S. Appl. No. 14/868,864, Nonfinal Office Action, dated Jun. 7, 2019.
U.S. Appl. No. 14/868,874, Final Office Action, dated Dec. 13, 2019.
U.S. Appl. No. 14/868,874, Nonfinal Office Action, dated Sep. 3, 2019.
U.S. Appl. No. 14/871,170, Nonfinal Office Action, dated Jun. 27, 2019.
U.S. Appl. No. 14/871,230, Final Office Action, dated Nov. 25, 2019.
U.S. Appl. No. 14/871,230, Nonfinal Office Action, dated May 23, 2019.
U.S. Appl. No. 14/871,273, Final Office Action, dated Nov. 15, 2019.
U.S. Appl. No. 14/871,306, Final Office Action, dated Aug. 26, 2019.
U.S. Appl. No. 14/871,341, Final Office Action, dated Dec. 26, 2018.
U.S. Appl. No. 14/871,341, Final Office Action, dated Dec. 31, 2019.
U.S. Appl. No. 14/871,341, Office Action, dated Jun. 25, 2019.
U.S. Appl. No. 14/871,401, Notice of Allowance, dated Aug. 12, 2019.
U.S. Appl. No. 15/457,705, Final Office Action, dated Oct. 7, 2019.
U.S. Appl. No. 15/704,339, Nonfinal Office Action, dated Jan. 2, 2020.
U.S. Appl. No. 15/704,350, Nonfinal Office Action, dated Dec. 26, 2019.
U.S. Appl. No. 15/704,363, Nonfinal Office Action, dated Oct. 1, 2019.
U.S. Appl. No. 15/704,632, Nonfinal Office Action, dated Oct. 24, 2019.
U.S. Appl. No. 15/869,752, Nonfinal Office Action, dated Oct. 31, 2019.
U.S. Appl. No. 14/871,170, Final Office Action, dated Jan. 3, 2020.

\* cited by examiner

RISK MITIGATION FOR AFFINITY GROUPINGS

CROSS-REFERENCE TO RELATED APPLICATIONS

This application is a continuation-in-part of U.S. application Ser. No. 14/871,401 filed on Sep. 30, 2015 now U.S. Pat. No. 10,510,120, issued Dec. 17, 2019 and entitled "System and Method for Obtaining and/or a Maintaining Insurance Coverage," which claims priority to and the benefit of:
  U.S. Provisional Application No. 62/060,080 filed on Oct. 6, 2014 and entitled "System and Method for Obtaining and/or a Maintaining Insurance Coverage,"
  U.S. Provisional Application No. 62/104,596 filed on Jan. 16, 2015 and entitled "System and Method for Obtaining and/or a Maintaining Insurance Coverage,"
  U.S. Provisional Application No. 62/189,885 filed on Jul. 8, 2015 and entitled "System and Method for Obtaining and/or a Maintaining Insurance Coverage," and
  U.S. Provisional Application No. 62/199,008 filed on Jul. 30, 2015 and entitled "System and Method for Obtaining and/or a Maintaining Insurance Coverage,"
the entire disclosures of which are hereby incorporated by reference herein. This application also claims priority to and the benefit of U.S. Application No. 62/471,224, filed Mar. 14, 2017 and entitled "System and Method for Obtaining and/or Maintaining Insurance Coverage," claims priority to and the benefit of U.S. Application No. 62/485,725, filed Apr. 14, 2017 and entitled "System and Method for Obtaining and/or Maintaining Insurance Coverage," claims priority to and the benefit of U.S. Application No. 62/503,184, filed May 8, 2017 and entitled "System and Method for Obtaining and/or Maintaining Insurance Coverage," claims priority to and the benefit of U.S. Application No. 62/551,618 filed on Aug. 29, 2017 and entitled "Risk Mitigation for Affinity Groupings," and claims priority to and the benefit of U.S. Application No. 62/593,727 filed on Dec. 1, 2017 and entitled "Risk Mitigation for Affinity Groupings," the entire disclosures of which are hereby incorporated by reference herein. Additionally, this application is related to U.S. application Ser. No. 14/868,864, filed Sep. 29, 2015 and entitled "System and Method for Obtaining and/or Maintaining Insurance Coverage," and to U.S. application Ser. No. 14/868,874, filed Sep. 29, 2015 and entitled "System and Method for Obtaining and/or Maintaining Insurance Coverage," the entire disclosures of which are hereby incorporated by reference herein.

FIELD OF THE DISCLOSURE

The present disclosure generally relates to insurance and, more specifically, to systems and methods for automatically mitigating risk related to insurance.

BACKGROUND

Today, insurance companies or providers rely on various techniques to mitigate and/or manage risk that is related to the insurance policies that they sell, issue, and administer. For example, an insurance provider or company (e.g., a ceding company) may enter into a reinsurance agreement with another insurance provider or company (e.g., a reinsurer). The reinsurance agreement details the conditions upon which the reinsurer would pay a share of the claims incurred by the ceding company. The reinsurer may be paid a "reinsurance premium" by the ceding company, which issues insurance policies to its own policyholders. Accordingly, by using re-insurance, the ceding company may mitigate its risk in providing insurance to policyholders by utilizing the secondary insurance market. However, re-insurance requires insurance companies or providers of primary insurance to go through lengthy and cumbersome processes to find and negotiate suitable terms with a re-insurer.

SUMMARY

The present embodiments may, inter alia, automatically provide insurance providers or insurance companies with novel risk mitigation or management techniques, which may or may not be utilized in conjunction with re-insurance, to thereby reduce or eliminate the time and/or effort that insurance providers and/or companies must spend researching the offerings of and negotiating with different re-insurance providers, as well as providing insurers with risk mitigation at a lower cost and/or that is more reflective of a risk score, characteristics, and/or preferences of the secondary insurance market. The terms "insurer," "insurance provider" and "insurance company" are utilized interchangeably herein to refer to a company, organization, enterprise or other entity that sells or otherwise provides primary insurance to policyholders (which may be individuals, groups, other organizations, or businesses). The insurance policies issued by the insurance provider or company may include any one or more types of primary insurance, such as vehicle, home, business, crop, property, catastrophic, umbrella, health, liability, flood, hurricane, fire, etc. Generally, an insurance provider or company may reap profits and/or incur losses based upon the insurance policies it issues. An "insured" or "insured party," as utilized interchangeably herein, refers to the named party or parties (which may be individuals, groups, companies, organizations, etc.) whose life, property, assets, etc. is protected by an insurance policy, and/or who is to be compensated for loss by the insurance policy.

The insurance provider or insurance company (or, alternatively, an intermediary entity acting on behalf of the insurance provider or company) may implement at least some of the novel methods and/or systems described herein to mitigate and/or manage the risk of at least a portion of the insurance policies that the insurance provider or company has issued, administrates, and/or holds (e.g., "in-force" insurance policies). Various insurance policies may be grouped with other insurance policies that have the same or similar risk levels, thereby forming one or more affinity groups of insurance policies based upon risk levels. Risk levels may be determined based upon, for example, geographic location; one or more characteristics of the insured item (e.g., the object, article, property, crop, vehicle, life, service, business, liability, excess liability, health, etc. that is covered by the insurance policy); one or more characteristics of the insured party; one or more terms of the insurance policy; historical claim data; and/or other parameters and/or characteristics corresponding to the insurance policies that are indicative of their risk. Risk levels may be determined, defined, estimated, predicted, and/or categorized, for example, by using actuarial science techniques, machine learning techniques, and/or any other suitable technique(s).

For a particular affinity group of insurance policies of a particular risk level, a set of financial instruments may be created and offered to potential investors (which may be individuals, groups, companies, organizations, etc.), such as through an online auction, where each of the financial instruments is governed by a set of terms that define an agreement between an investor and the provider of the financial instrument, for example, when and how profits and losses are to be distributed or apportioned, ownership rights and termination procedures, any service or maintenance fees, etc. Generally speaking, any investor in the financial instrument enters into an agreement with the provider of the financial agreement based upon the financial agreement's accompanying terms. Once a winning bid is accepted, at least a portion of the risk associated with the insurance policies of the particular affinity group is assumed for a particular interval of time by the investor(s) that submitted the winning bid, e.g., per the terms of the financial instrument(s). As such, at least a portion of any profits reaped by the insurance policies of the particular affinity group may be distributed to the investor per the terms of the financial instruments, e.g., at some time after the particular interval of time has passed or expired. Likewise, at least a portion of any losses incurred by the insurance policies of the particular affinity group may be borne by the investor per the terms of the financial instruments, e.g., at some time after the particular interval of time has passed or expired. For example, the investor may reimburse the insurance provider or company (or alternatively, may reimburse the intermediary entity) for at least a portion of any losses incurred by the insurance policies of the particular affinity group, e.g., per the terms of the financial instruments.

In one aspect, a computer-implemented method for securitizing profit or loss associated with insurance claims may be provided. The method may include (1) dividing or segmenting, via one or more processors of a securities provider and based upon risk levels, multiple insurance policies into multiple affinity groups, the multiple insurance policies held by an insurance provider; (2) creating, by the one or more processors of the securities provider, a set of financial instruments corresponding to a particular affinity group of the multiple affinity groups, the particular affinity group having a particular level of risk, and each financial instrument included in the set of financial instruments indicative of a respective assumption of risk for the particular affinity group over a time interval; (3) procuring, by the one or more processors of the securities provider, one or more other parties for at least a portion of the set of financial instruments (which may include, for example, auctioning the opportunity to invest in the at least the portion of the set of financial instruments and accepting one or more bids), thereby securitizing and/or distributing the risk associated with the insurance policies included in the particular affinity group 410; and/or (4) distributing, by the one or more processors of the securities provider, at least a portion of profit or loss incurred by respective insurance policies included in the particular affinity group over the particular policy period to the one or more other parties in accordance with terms of the set of financial instruments. The method may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts one embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
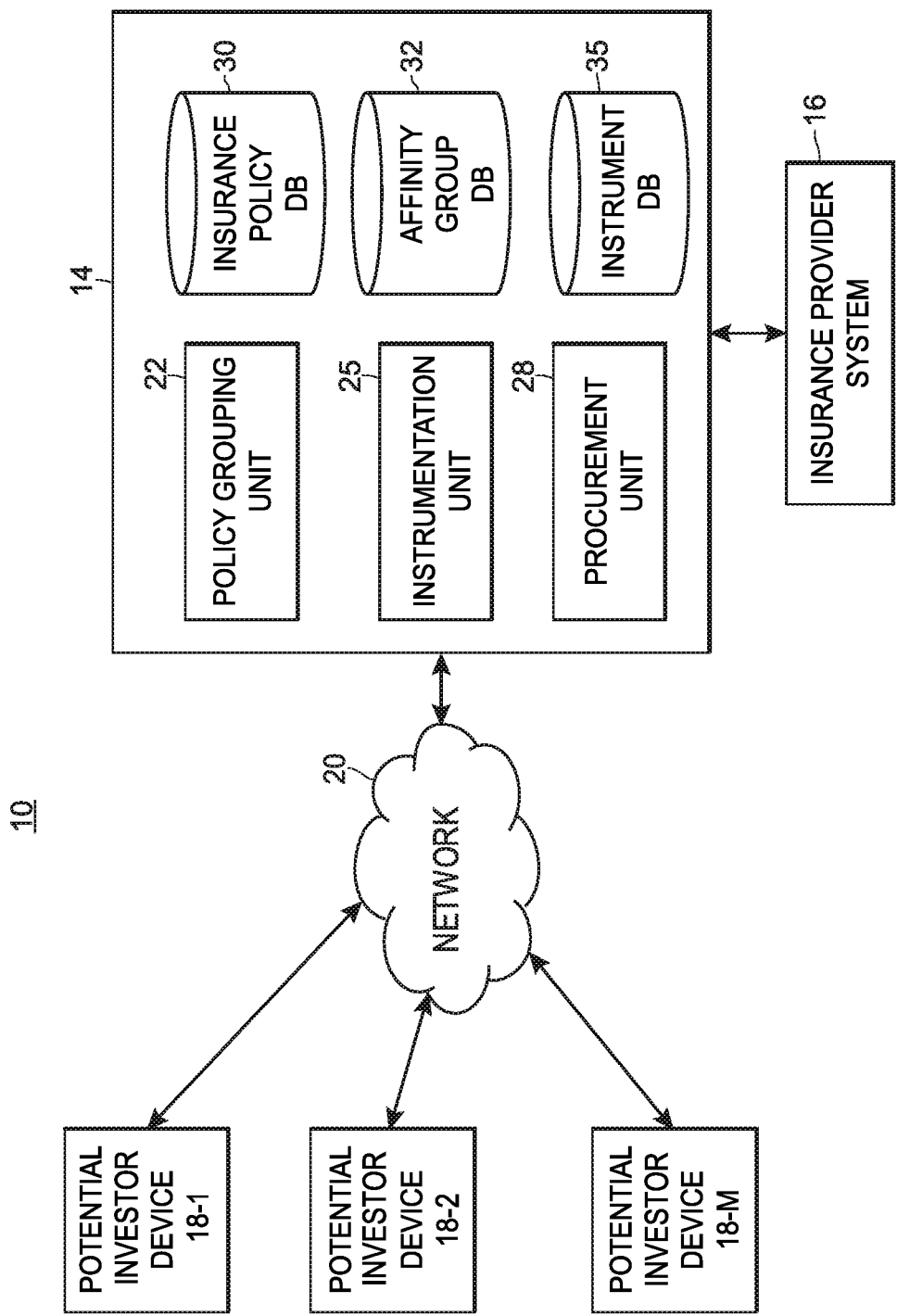
FIG. 1 depicts an exemplary computing environment including components associated with mitigating and/or managing the risk of providing insurance, according to one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

I. Exemplary Automatic Risk Mitigation of Insurance Policies

The present embodiments relate to, inter alia, mitigating the risk, to insurance providers and/or companies, of insurance policies that are held by the insurance providers and/or companies. The insurance policies may be policies for any type of primary insurance, such as automobile or other vehicle insurance, home or condominium insurance, personal property or article insurance, life insurance, health insurance, pet insurance, burial insurance, liability insurance, umbrella insurance, renters' insurance, fractional-ownership insurance, disaster insurance (e.g., to cover damage from fire, flooding, hurricane, storm, etc.), crop insurance, business insurance, insurance that covers the loss and/or damage of other assets, insurance that covers liability claims, etc. In some scenarios, the insurance policies whose risk is desired to be mitigated or managed may be secondary or supplemental insurance, such as secondary coverage and/or re-insurance. The risk mitigation techniques of the present embodiments may be performed at least partially by the insurance provider or company, at least partially by an intermediary entity acting on behalf of the insurance provider or company, and/or at least partially by another, third-party entity, such as a securities or investment provider.

In some embodiments, the insurance policies for which the insurance provider is responsible (e.g., the in-force insurance policies that the insurance provider holds) may be segmented or divided into one or more affinity groups. Each affinity group may include a respective set of insurance policies having the same or similar risk levels. That is, each affinity group may be defined by any suitable criterion or criteria that is indicative of the risk of the policies included therein, such as risk characteristics of the insurance policies (e.g., as is typically determined during the underwriting process); geographic location; one or more characteristics of the insured items (e.g., objects, articles, properties, crops, vehicles, lives, services, businesses, liability, excess liability, health, etc.) covered by the insurance policies; one or more characteristics of the insured parties or insureds (e.g., the parties that applied for and procured the insurance, the owners and or beneficiaries who may be compensated for loss of or damage to the insured items, etc.); one or more terms of insurance policies; historical claim data; and/or other parameters and/or characteristics corresponding to the insurance policies that are indicative of their respective risk. Risk levels and/or the criteria or criterion upon which the risk levels are determined may be discovered, determined, defined, and/or categorized by using actuarial science techniques, machine learning techniques, and/or any other suitable technique(s). Thus, typically, but not necessarily, an affinity group may include multiple insurance policies having similar or the same risk characteristics. In some scenarios, an affinity group may be further defined (e.g., further segmented from other policies held by the insurance provider) based upon other characteristics which may not necessarily be (or may not primarily be) indicative of risk, such as policy term expiration dates; insureds' memberships in (or affiliations with) an organization, such as a professional organization or association, a fraternity or sorority, a service or volunteer organization, a business or company, etc.; preferences of the insureds; etc.

For a particular affinity group of insurance policies having a particular risk level, a set of financial instruments may be created and offered to investors to thereby share the risk associated with the insurance policies included in the particular affinity group with investors. In one embodiment, the set of financial instruments for the particular affinity group may include a number of tranches (e.g., multiple tranches) that are offered to investors, where each tranch may be associated with a different portion of the particular affinity group's risk, and optionally has a different maturity date. Investors in the financial instruments may be procured in any suitable manner, however, particular benefits and advantages are realized by automatically procuring investors in the financial instruments electronically, such as automatically through an online auction.

When one or more winning bids of the online auction are accepted, at least a portion of the risk associated with the insurance policies of the particular affinity group is assumed for a particular interval of time by the investor(s) that submitted the winning bid(s), e.g., per the terms of the financial instruments. A "winning" bid may be automatically determined based upon one or more criteria. For example, a winning bid may be a bid that includes a highest (or a higher) percentage of assumption of risk associated with the subject insurance policies. A winning bid may be a bid that has a lowest (or lower) percentage of shared profit associated with the subject insurance policies that the bidder is willing to accept, and/or a highest (or higher) percentage of shared loss associated with the insurance policies that the bidder is willing to accept. In some implementations, a winning bid may be a bid that indicates a highest (or a higher) service fee (or, alternatively, a lowest or lower commission amount) that is levied with the procurement of the financial instruments for the bidder. For example, a bid may indicate a service fee that is a fixed or flat amount, and/or the bid may indicate a fee that is a percentage of the premiums of the subject insurance policies (e.g., a percentage of the collected premiums). A winning bid may define the particular interval of time over which the bidding terms (and therefore, the assumed risk) are to be in-force, e.g., may define a maturity date or time to expiration of one or more of the financial instruments. Of course, one or more other criteria included in auction bids may be additionally or alternatively utilized to determine a winning bid.

At any rate, during the lifetimes of the insurance policies included in the particular affinity group, the insurance provider may directly collect premium payments and handle claims and/or other inquiries from the insureds. Upon expiration, or at some time after the expiration of the particular interval of time to which an accepted bid applies (e.g., upon maturity of the respective portion of the set of financial instruments, which may or may not correspond to the lifetime of the corresponding insurance policies), at least a portion of any profits reaped by the insurance policies of the particular affinity group may be distributed to the corresponding investor(s), e.g., per the terms of the financial instruments. Likewise, upon expiration of the particular interval of time (e.g., upon maturity) or at some time after the expiration, at least a portion of any losses incurred by the insurance policies of the particular affinity group may be borne by the corresponding investor(s), e.g., per the terms of the financial instruments. For example, upon expiration of the particular interval of time (e.g., upon maturity) or at some time after the expiration, the investor(s) may reimburse the insurance provider or company (or alternatively, may reimburse the intermediary entity) for at least a portion of any losses incurred by the insurance policies of the particular affinity group, e.g., per the terms of the financial instruments.

Periodically, or at any desired time such as upon maturity, the set of financial instruments associated with the particular affinity group and/or the terms of the financial instruments may be updated or modified and again offered to potential investors. Additionally or alternatively, periodically, or at any desired time, updated, new, or changed affinity groups or groupings of insurance policies held by the insurance provider may be formed, created, or generated, and corresponding updated, new, or changed financial instruments corresponding to the re-formed and/or newly formed affinity groups of insurance policies may be created and offered to investors.

By using one or more of the techniques described above, insurance providers may be able to automatically mitigate and/or manage at least a portion of the risk associated with the insurance policies of a particular affinity group of a particular level of risk at the most competitive price and/or terms available, automatically on a continuing basis, and without the hassles of procuring re-insurance on their own. As such, the risk associated with the insurance policies of the affinity group may be securitized, and profit and/or loss associated with the affinity group may be shared between the insurance provider and investors.

Additionally, in some embodiments, the winning bidding party may not only assume at least a portion of the risk associated with the insurance policies included in the particular affinity group, but may also assume at least a portion of the responsibility of providing, administering, and/or servicing the insurance policies themselves, e.g., collecting premium payments, handling claims and customer inquiries, and the like. A winning bidding party's span of responsibility for administering and/or service the insurance policies may be defined in the financial agreement, and optionally may be described in the request for bid.

In these embodiments, a winning bidding party may be similar to the winning bidding party disclosed in aforementioned U.S. Provisional Patent Application 62/503,184, entitled "System and Method for Obtaining and/or Maintaining Insurance Policies." For example, in some implementations, the winning bidding party may assume the role of primary insurance provider of the insurance policies included in the affinity group, e.g., per the terms of the corresponding agreement. For instance, insurance policies included in the affinity group may be transferred to the winning bidding party, and/or winning bidding party may issue (or re-new) insurance policies directly to (or with) the insureds of the affinity group.

In other implementations, the winning bidding party may assume at least a portion of the administration and/or servicing of the insurance policies included in the affinity group, either with or without the knowledge of the insured parties associated with the insurance policies. For example, the winning bidding party may be a contractor to the insurance provider that provides at least portion of insurance administration and/or services on behalf of the insurance provider, and as such provides the administration and/or the services in a manner that is transparent to the insured parties.

At any rate, irrespective of the span of responsibility assumed by the winning bidding party for providing, administering, and/or servicing the insurance policies of the affinity group, in these embodiments, the insurance policies included in the affinity group may be implemented with lower costs to the insureds and/or may provide insurance that is more reflective of actual risk (or lack thereof). Further, advantageously, in these embodiments, the insureds may automatically receive the most competitively priced insurance coverage (and/or insurance with the best product features) with little or no additional effort.

II. Exemplary Environment for Automatically Mitigating Risk of Insurance Policies FIG. 1 depicts an example environment 10 including components associated with mitigating and/or managing the risk of insurance policies, according to one embodiment. As illustrated in FIG. 1, the environment 10 may include a risk mitigation system 14 which may be associated with, owned, and/or operated by an insurance provider, or which may be associated with, owned, and/or operated by another entity (e.g., an intermediary entity or a third-party) that is separate and distinct from the insurance provider. The risk mitigation system 14 may include one or more servers, and/or may include a plurality of networked computing devices that have an appearance of a single, logical computing device or system, e.g., a group of cloud computing devices. Similarly, a computing system 16 of the insurance provider may include one or more servers, and/or may include a plurality of networked computing devices that have the appearance of a single, logical computing device or system, e.g., a group of cloud computing devices. FIG. 1 depicts the risk mitigation system 14 and the insurance provider system 16 as being separate systems that are in direct communication, such as when the risk mitigation system 14 is associated with, owned, and/or operated by an intermediary entity or third-party other than the insurance provider 16, or such as when the risk mitigation system 14 is associated with, owned, and/or operated by the insurance provider 16 but is a separate system (e.g., firewalled, etc.) from the insurance provider system 16. In another embodiment (not shown in FIG. 1), the risk mitigation system 14 and the insurance provider system 16 may be communicatively connected via the network 20. In still another embodiment (not shown in FIG. 1), the risk mitigation system 14 and the insurance provider system 16 may be an integral system, typically in situations when the insurance provider 16 is associated with, owned, and/or operated by the insurance provider 16.

The risk mitigation system 14 may be communicatively coupled to one or more computing devices 18-1 through 18-M, which may be respectively associated with, owned, and/or operated by one or more potential investors such as individuals, groups, organizations, companies, investment funds, other insurance providers, and/or other entities, for example. Typically (but not necessarily), the one or more computing devices 18-1 through 18-M and the risk mitigation system 14 may be communicatively coupled via a network 20. A computing device 18-$x$ may be any suitable type of computing device having wired and/or wireless communication capabilities, such as a personal computer, tablet, phablet, smartphone, etc. In some embodiments, such as when a potential investor is a company or other organization, its respective computing device 18-$x$ may be a computing system comprising a plurality of computing devices and/or networks. The network 20 may be a single communication and/or data network, or may include multiple communication and/or data networks of one or more types (e.g., one or more wired and/or wireless local area networks (LANs), and/or one or more wired and/or wireless wide area networks (WANs) such as the Internet), for example. The network 20 may include private networks and/or public networks.

The risk mitigation system 14 may include various units, including a policy grouping unit 22, an instrumentation unit 25, and a procurement unit 28. Each of some or all of the units 22, 25, 28 may be (or may include) a respective set of one or more computing devices or processors that executes software instructions stored on tangible, non-transitory data storage media to perform the corresponding functions described herein. Alternatively, each of some or all of the units 22, 25, 28 may be or include a respective component of software that is stored on one or more tangible, non-transitory computer-readable storage media (e.g., a random access memory (RAM) and/or read-only memory (ROM) of the risk mitigation system 14) and executed by one or more processors of the risk mitigation system 14 to perform the corresponding functions described herein. Further, one or more of the units may be combined into a single unit, or may be omitted. In various different embodiments, for example, the risk mitigation system 14 may not include policy grouping unit 22, the instrumentation unit 25 and the procurement unit 28 may be an integral unit, and/or the risk mitigation system 14 may include one or more other units that are not illustrated in FIG. 1 to perform at least some of the corresponding functions described herein and optionally additional functions, such as a notification unit, an administration unit, an audit unit, etc.

Additionally, the risk mitigation system 14 may include various data storage entities or databases, including an insurance policy data storage entity or database 30, an affinity group data storage entity or database 32, and an instrument data storage entity or database 35. The data storage entities 30, 32, 35 may include one or more persistent, non-transitory, tangible memories, which may be implemented in any desired or suitable manner, e.g., by using separate and distinct data storage units, data bank, cloud data storage, etc. It is noted that in FIG. 1, the insurance policy database 30, the affinity group database 32, and the instrument database 35 are illustrated as being separate and distinct logical databases; however, in some implementations, the logical databases 30, 32, 35 may be implemented at least partially, if not entirely, on a same physical data storage platform. Generally speaking, the insurance policy database 30 stores indications of insurance policies that are in-force and that are issued, held, owned, administered, and/or serviced by the insurance provider 16, so that the insurance provider 16 reaps profits and/or incurs losses from said insurance policies.

The insurance policies may be primary insurance policies for any one or more types of insurance, such as automobile or other vehicle insurance, home or condominium insurance, personal property or article insurance, life insurance, health insurance, pet insurance, burial insurance, umbrella insurance, renters' insurance, fractional-ownership insurance, disaster insurance (e.g., to cover damage from fire, flooding, hurricane, storm, etc.), crop insurance, business insurance, insurance that covers the loss and/or damage of other assets, insurance that covers liability claims, etc. In some scenarios, at least some of the insurance policies may be secondary insurance policies, such as re-insurance or supplemental insurance.

In one embodiment, policy grouping unit 22 may utilize at least some of the information that is stored in insurance policy database 30 and that is descriptive of the insurance policies of the insurance provider 16 to form one or more affinity groups. For example, the policy grouping unit 22 may divide or segment the insurance policies of the insurance provider 16 into multiple affinity groups, each of which may include a respective, mutually exclusive subset of the insurance policies. Policy grouping unit 22 may place various ones of the insurance policies into a particular affinity group based upon a level of risk by which members of the particular affinity group may be characterized.

Generally, a risk level of an insurance policy may be determined based upon one or more characteristics of the insurance policy, such as, for example, geographical location, policy terms, characteristics of the insured party, characteristics of the object of the insurance policy (e.g., real property, a business, a service, liability, health, etc.) and/or any other characteristic or parameter of the insurance policy, and the determination may be made using any one or more suitable risk characterization technique, such as actuarial science and/or other underwriting techniques, machine learning techniques, etc. The characterization of the risk of a particular insurance policy may be, for example, a quantified risk measurement, risk prediction, and/or risk estimate of the policy. As such, the level of risk corresponding to the particular affinity group may be indicative of a range of quantified risk measurements, risk predictions, and/or risk estimates of insurance policies included therein, for example. The policy grouping unit 22 may store indications of which of the insurance policies belong to which affinity groups in the affinity group database 32, and optionally may store other indications corresponding to, for example, risk level of the affinity group, total number of policies included in the affinity group, characteristics of the policies included in the affinity group, etc.

In some embodiments, in addition to risk level or risk characterization, policy grouping unit 22 utilizes additional other criterion or criteria associated with the insurance policies to form affinity groups. For example, policy grouping unit 22 may form affinity groups further based upon preferences and/or requirements of the insurance provider 16, a classification and/or rating of insurance provider 16, historical insurance claim data, etc. For example, claims information from insurance provider 16 (e.g., number and/or dates of past claims, past claim payouts made to or on behalf of the insured, etc.) may be obtained.

To mitigate the risk of the insurance policies included in a particular affinity group having a particular risk level to the insurance provider 16, the instrumentation unit 25 may create or generate a set of one or more financial instruments that may be offered to potential investors 18-1 through 18-M. Generally speaking, a party that invests in at least a portion of the set of financial instruments corresponding to the particular affinity group may share in any profits and/or losses associated with the insurance policies included in the particular affinity group. That is, an investing party assumes at least a portion of the risk associated with the insurance policies included in the particular affinity group.

Each financial instrument included in the set of financial instruments need not have equivalent terms, and may be respectively offered up to potentially different types of investors. For example, the set of financial instruments may be divided or segmented by more granular risk levels, by different times to expiration of subsets of the set of financial instruments (e.g., by different maturation dates), by different maximum percentages of shared profits, by different minimum percentages of shared losses, and/or other criteria. However, each financial instrument included in the set of financial instruments may be structured according to respective terms to which both a potential investor and the risk mitigation system 14 agree. The instrumentation unit 25 may store indications of the financial instruments associated with the particular affinity group and their respective terms in the instrument database 35, for example.

The procurement unit 28 may automatically procure investors for the set of financial instruments of the particular affinity group. In one embodiment, the procurement unit 28 may conduct an automated, online auction to obtain investors in the set of financial instruments of the particular affinity group. For example, the procurement unit 28 may automatically provide, to the potential investors 18-1 through 18-M, information indicative of the particular affinity group and the set of financial instruments associated therewith, such as risk level, number of policies included in the particular affinity group, types of insurance policies, respective terms of agreement for the financial instruments, etc., along with a request for a bid to invest in at least some of the financial instruments associated with the particular affinity group. Of note, for privacy and protection reasons, procurement unit 28 does not provide or release any information that is specific to individuals and to individual insurance policies included in the particular affinity group, e.g., does not release or provide any individual consumer personal data associated with individual insurance policies. A policyholder of an individual insurance policy may be provided with an option to opt-into releasing his or her personal data, and such data would be shared only after the policyholder's affirmative consent or permission has been obtained.

At any rate, the request for bid that the procurement unit 28 sends to potential investors 18-1 through 18-M may indicate one or more criteria based upon which bids are to be evaluated. One example bidding criterion may be a respective percentage of risk that a bidder or bidding party is willing to assume. Other bidding criteria may include, for example, a maximum percentage of profit returned by the insurance policies of the particular affinity group that a bidder is willing to be apportioned, a minimum percentage of loss incurred by the insurance policies of the particular affinity group that a bidder is willing to bear, and/or a length of a lifetime of at least one of the financial instruments, e.g., a maturity duration, that a bidding party is willing to accept. In some scenarios, a bidding criterion may be a maximum amount of a fee, such as a service fee or commission, that a bidding parting is willing to pay (e.g., to the insurance provider 16) for the opportunity to invest in at least some of the financial instruments. For example, the service fee may be based upon a percentage of the premiums of the insurance policies included in the particular affinity group. Other bidding criteria may additionally or alternatively be indicated in the bid request put forth by the procurement unit 28. In an example, any one or more of the terms of the set of financial instruments may be utilized as a bidding criterion. In some scenarios, the bid request may indicate a relative priority or weighting of multiple bidding criteria for the auction.

After analyzing the information received from the procurement unit 28, one or more of the potential investors 18-1 through 18-M may decide to bid on at least a portion of the financial instruments, and procurement unit 28 may receive the bid(s) from respective bidders of the investor computing systems 18-1 through 18-M. In one embodiment, policy procurement unit 28 may send each received bid to all others of the investor computing systems 18-1 through 18-M, and bidding may continue in an iterative fashion until auction termination criteria have been met (e.g., until a predetermined amount of time elapses, or until a predetermined amount of time since the last bid elapses, etc.). One or more of the investors 18-1 through 18-M having the most suitable bids at the time the auction terminates may be granted the ability to invest in at least a portion of the set of financial instruments, e.g., their bids are accepted as winning bids. The winning bidding party or parties may then be automatically entered into a binding contract for the financial instruments indicated by the accepted bids (which may be a subset of the set of financial instruments, or may be the entirety of the set of financial instruments), e.g., in accordance with the terms of the particular financial instruments corresponding to the winning bid(s), and thereby is invested in the financial instruments indicated by the accepted bids.

One of the terms of the financial instruments may indicate an expiration time interval or time to maturity of the respective financial instrument. Different subsets of the set of the financial instruments may have different maturities, in some implementations, or, in another implementation, the entire set of financial instruments corresponding to the particular affinity group may have a common maturity. In some arrangements, the time to maturity of one or more financial instruments may be based upon a length of a term or duration limit of one or more insurance policies included in the particular affinity group. Maturity durations may be pre-defined and included in the initial requests to bid, and/or maturity durations may be a bidding criterion.

It is noted that the winning bidding party or parties (or all bidding parties) may need to be qualified, e.g., to verify or ascertain that the party or parties have the financial ability to enter into the financial agreements of the financial instruments and/or to assume a respective portion of the risk associated therewith. For example, various aspects of a bidding party, such as income, net worth, assets, outstanding debts, governance status, professional experience, etc., may be examined and/or analyzed to determine whether or not the bidding party is financially qualified to enter into the agreement. Additionally or alternatively, other checks such as credit checks and/or background checks may be performed. Still additionally or alternatively, other conditions for qualification may be associated with the financial instruments, such as a minimum amount of money that is to be kept in escrow or otherwise held in an account for the duration of the financial agreement. As such, in the request for bid provided to potential investors, minimum qualifying criteria of bidding parties may be included and/or identified as bidding criteria.

Accordingly, a submitted bid may include (and/or may reference) information that demonstrates the bidding party's fitness with respect to the qualifying criteria, and the submitted bid may be evaluated based at least partially on the bidding party's submitted qualifying information. Additionally or alternatively, after a winning bidder has been identified and prior to executing the financial agreement, a more rigorous analysis of whether or not the winning bidder is qualified to enter into the financial agreement may be performed.

At any rate, upon expiration of the time interval, at some time after the expiration, or upon maturation of the particular financial instrument, any profits that are generated by the insurance policies of the particular affinity group during the time interval may be distributed amongst its investors and the investment provider 16 in accordance with the terms of the particular financial instrument. Similarly, upon expiration of the time interval, at some time after the expiration, or upon the maturation of the particular financial instrument, any losses that are incurred by the insurance policies of the particular affinity group during the time interval may be distributed amongst its investors and the investment provider 16 in accordance with the terms of the matured financial instruments. For example, investors may reimburse the insurance provider 16 a monetary amount and/or a number of shares in accordance with the terms of the particular financial instrument.

Thus, in a sense, the profits and losses generated by the insurance policies of the particular affinity group may be securitized by the creation of financial instruments, the procurement of investors for the created financial instruments, and the entering into financial agreements with the procured investors. Accordingly, the risk mitigation system 14 may mitigate the risk, to the insurance provider 16, that is associated with the insurance policies of the particular affinity group. Moreover, the risk mitigation system 14 creates additional investing vehicles which are made available to investors 18-1 through 18-M, so that profits and/or losses generated by the insurance policies may be shared between the insurance provider 16 and other investors 18-1 through 18-M. Further, as the risk associated with the insurance policies may be distributed across and/or assumed by multiple parties, the terms of the insurance policies themselves may become more favorable to the policyholders, e.g., premiums may be lowered, deductible amounts may be lowered, total coverage amounts may increase, etc.

It is appreciated that the risk mitigation system 14 may be configured to provide additional granularity in the mitigation and/or management of risk of insurance policies. For example, the set of financial instruments that are created to securitize the level of risk of the insurance policies included in the particular affinity group may be grouped into different subsets of financial instruments corresponding to different sub-ranges of risk within the risk level of the affinity group. Additionally or alternatively, the set of financial instruments may be segmented into different subsets of financial instruments that have different expiration time intervals. That is, the expiration times of different subsets of the financial instruments may be staggered.

In some embodiments, at least some of the financial instruments associated with the particular affinity group (e.g., a particular segment or subset of the set of financial instruments) may be renewable. For example, as said financial instruments are nearing maturity, or as the date on which the financial instruments expire nears (e.g., one month before expiration, one week before expiration, etc.), procurement unit 28 may automatically administer another auction for a renewal of said financial instruments, either by using the same or similar terms as those of the expiring financial instruments, or by using updated terms.

In some embodiments, one or more affinity groups may be re-formed, e.g., upon maturity of various financial instruments, periodically, and/or when desired. For example, one or of more affinity groups may be re-formed after an updated risk analysis has been performed on at least a portion of the insurance policies, and/or when insurance policies are renewed.

In some implementations, different subsets of the set of financial instruments corresponding to the particular affinity group may be put out to bid by the procurement unit 28 based upon different bidding criteria, which may vary in type of bidding criteria and/or in number of different bidding criteria. In some implementations, a bidding party may suggest another criterion upon which bids may be based, and the procurement unit 28 may or may not update the bidding criteria of the current auction accordingly in a subsequent round of bidding.

Further, at least a portion of the risk management system 14 may be implemented using blockchain technologies or architectures, thereby providing high security and accuracy to transactions of the risk management system 14. For example, the procurement unit 28 may implement an electronic, online auction to procure investors in the set of financial instruments by using blockchain technology, and/or may administer the financial instruments utilizing blockchain technology.

Still further, it is understood that the risk mitigation system 14 illustrated in Figure is only one of many embodiments. For example, in another embodiment (not shown), the policy grouping unit 22, the insurance policy database 30, and optionally the affinity group database 32 may be included in the insurance provider system 16, while the instrumentation unit 25, the procurement unit 28, and the instrument database 35 may be included in the separate risk mitigation system 14. In another example, the risk mitigation system 14 and the insurance provider system 16 may be an integral system. Other suitable configurations of the risk mitigation system 14 are possible. Moreover, the risk management system 14 may include additional or alternate aspects, features, units, and/or databases (not shown), and/or may be implemented by using other architectures (also not shown) to thereby mitigate and/or manage the risk associated with insurance policies of the insurance 16, and to provide different investment opportunities for potential investors 18-1 through 18-M.

Figure 2:
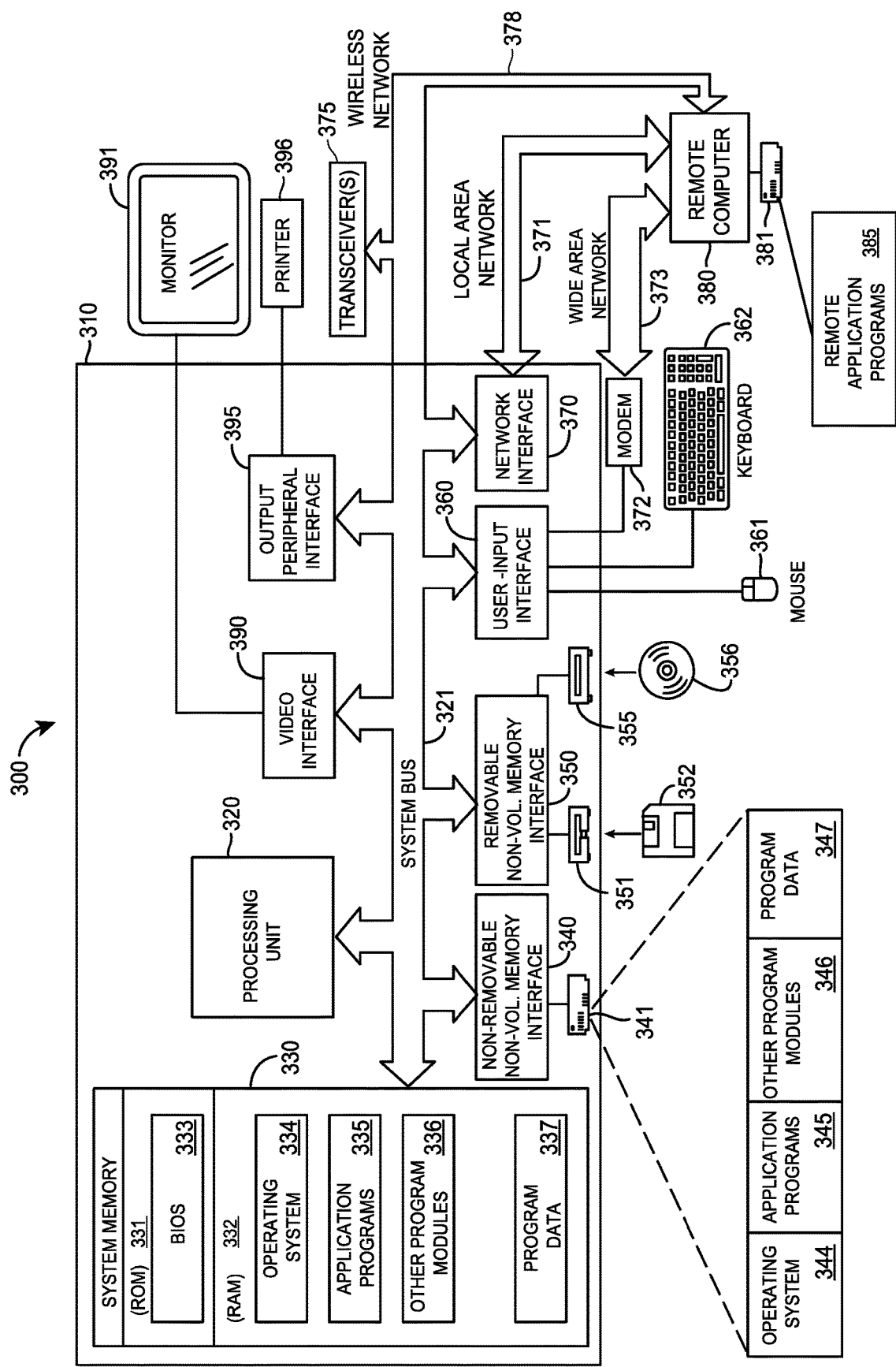
FIG. 2 depicts an exemplary computer system in which the techniques described herein may be implemented, according to one embodiment.

III. Exemplary Computer System for Automatically Mitigating Risk of Insurance Policies FIG. 2 depicts an example computer system 300 in which the techniques described herein may be implemented, according to one embodiment. In one embodiment, the computer system 300 may be included in the risk mitigation system 14 and/or the insurance provider system 16 of FIG. 1. For example, any one or more of the units 22-28 may comprise one or more instances of the computer system 300, or the intermediary entity 14 may comprise one or more instances of the computer system 300. The computer system 300 of FIG. 2 includes a computing device in the form of a computer 310. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 typically includes a variety of computer-readable media. Computer-readable media can be any available media that can be accessed by computer 310 and includes both volatile and nonvolatile media, and both removable and non-removable media. By way of example, and not limitation, computer-readable media may comprise computer storage media and communication media. Computer storage media includes tangible, volatile and nonvolatile, removable and non-removable media implemented in any method or technology for non-transitory storage of information such as computer-readable instructions, computer-executable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 2 illustrates operating system 334, application programs 335, other program modules 336, and program data 337.

The computer 310 may also include other removable/non-removable, volatile/nonvolatile computer storage media. By way of example only, FIG. 2 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 2 provide storage of computer-readable instructions, data structures, program modules and other data for the computer 310. In FIG. 2, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 2. For example, any of the computing devices 18-1 through 18-M may comprise one or more instances of the computer 380. The logical connections depicted in FIG. 2 include a local area network (LAN) 371 and a wide area network (WAN) 373, but may also include one or more other communication and/or data networks, which may comprise any number of wired networks and/or any number of wireless networks. Such networking environments are commonplace in hospitals, offices, enterprise-wide computer networks, private networks, intranets, and the Internet, for example.

When used in a LAN networking environment, the computer 310 is connected to the LAN 371 through a network interface or adapter 370. When used in a WAN networking environment, the computer 310 typically includes a modem interface 372 or other means for establishing communications over the WAN 373, such as the Internet. The modem 372, which may be internal or external, may be connected to the system bus 321 via the input interface 360, or other appropriate mechanism. When used in a wireless networking environment, the computing 310 typically includes one or more transceivers 375 or other means that are configured to generate wireless signals that support one or more wireless communications protocols to thereby establish communications over one or more public and/or private wireless networks 378. The communications connections 370, 372, 375 which allow the device to communicate with other devices, are an example of communication media, as discussed above. In a networked environment, program modules depicted relative to the computer 310, or portions thereof, may be stored in the remote memory storage device 381. By way of example, and not limitation, FIG. 2 illustrates remote application programs 385 as residing on memory device 381.

In some configurations, the computer 310 may be included in a plurality of networked computers or computing devices that have the logical appearance as a single, integral computing node, e.g., a cloud computing system. For example, the application programs 345, other program modules 346 and/or program data 337 may be stored in and executed by the logical, single computing node.

The techniques for automatically mitigating the risk of insurance policies described above may be implemented in part or in their entirety within a computer system such as the computer system 300 illustrated in FIG. 2. The computer 310 may be a server or computing device of an intermediary entity and/or insurance provider (e.g., within the risk mitigation system 14 and/or the insurance provider system 16 of FIG. 1), and the remote computer 380 may be a server or computing device of a potential investor (e.g., within one of the computing systems 18-1 through 18-M of FIG. 1), for example. In some such embodiments, the LAN 371 may be omitted (e.g., communications may between computer 310 and computer 380 may only occur via WAN 373). Application programs 335 and 345 may include programs that implement the policy grouping unit 22, instrumentation unit 25, and/or procurement unit 28 of FIG. 1, for example. Insurance policy database 30, affinity group database 32 and/or instrument database 35 may be locally stored on hard disk drive 341, magnetic disk 352 or optical disk 356, for example, and/or may be stored remotely from the computer 310 but nonetheless remain accessible to the computer 310, e.g., via the network interface 370, the modem 372, and/or the transceiver 375.

In operation, the computer 310 may obtain insurance policy information from the insurance policy database 32 (which may be local or remote) form affinity groups based upon that information, provide the remote computer 380 (and one or more other, similar computers of other insurance providers) at least some of the affinity group information along with a request for bids, and receive bids from the remote computer 380 (and/or from one or more other, similar computers of other potential investors). The computer 310 may then determine the winning bid and enact the financial instruments associated with the affinity groups to thereby mitigate and/or manage the risk of the insurance policies included in the affinity groups.

IV. Exemplary Computer-Implemented Method

Figure 3:
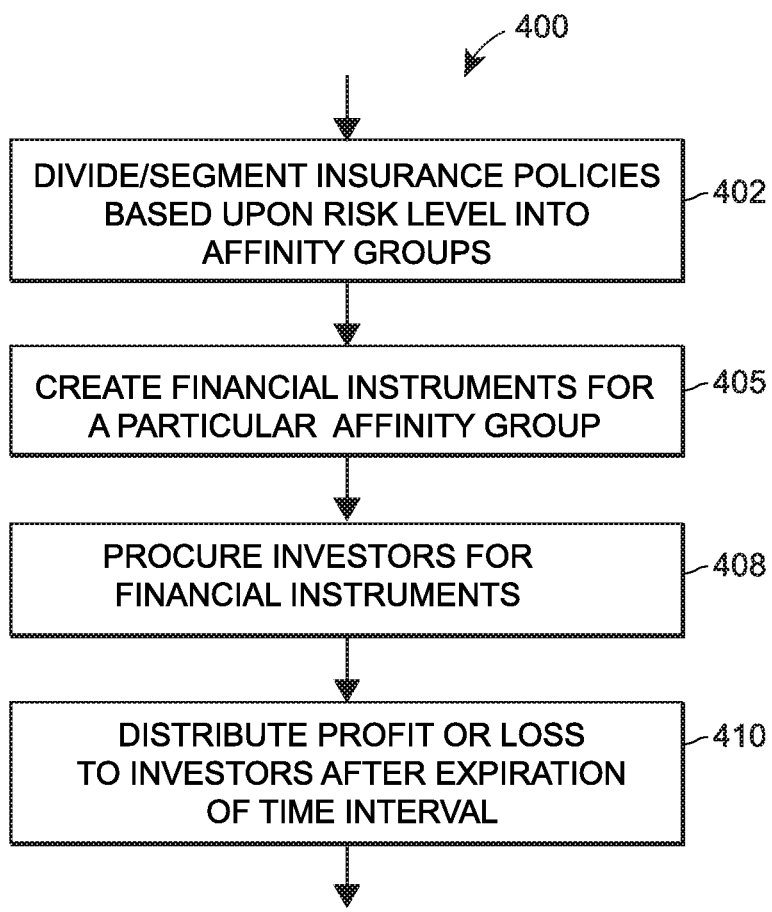
FIG. 3 depicts an exemplary computer-implemented method mitigating and/or managing the risk associated with insurance policies of an insurance provider, according to one embodiment.

FIG. 3 illustrates an exemplary computer-implemented method, e.g., for mitigating and/or managing the risk associated with insurance policies that are held by an insurance provider. In one embodiment, at least a portion of the method 400 may be performed by the system 10 of FIG. 1 and/or by the computer system 300 of FIG. 2. The method 400 may include, via one or more processors, computing devices, transceivers, or servers: (1) dividing or segmenting, based upon risk levels, multiple insurance policies into multiple affinity groups 402, where each affinity group is associated with a respective risk level; (2) creating a set of financial instruments corresponding to a particular affinity group included in the multiple affinity groups 405; (3) procuring one or more other parties for at least a portion of the set of financial instruments 408, e.g., as investors in the at least the portion of the set of financial instruments (which may include, for example, auctioning the opportunity to invest in the at least the portion of the set of financial instruments and accepting one or more bids), thereby securitizing the risk associated with the insurance policies included in the particular affinity group 410; and/or (4) distributing at least a portion of profit or loss incurred by respective insurance policies included in the particular affinity group and corresponding to the at least the portion of the set of financial instruments to the one or more other parties in accordance with the terms of the set of financial instruments. The method may include additional, fewer, or alternate actions, including those discussed elsewhere herein.

In particular, the method 400 may include (e.g., via one or more processors, computing devices, transceivers, or servers) dividing or segmenting, based upon risk levels, multiple insurance policies into multiple affinity groups (block 402). The multiple insurance policies may be offered, issued, provided, administered, and/or held by an insurance provider or company, and typically the multiple insurance policies are in-force insurance policies. At least some of the insurance policies may be primary insurance policies that insure or provide coverage for loss and/or damage to assets such as vehicles, homes, buildings, land, businesses, crops, property, real property, other types of tangible, physical assets, health, etc., and/or that provide protection against liability claims, catastrophes, disasters, flood, hurricane, fire, disaster, etc., and the like. At least some of insurance policies may be umbrella insurance policies that provide coverage above and beyond primary insurance policies, e.g., to protect against liability claims. In some scenarios, at least some of insurance policies may be secondary insurance policies, such as re-insurance or supplemental insurance. In most (but not all) implementations, a particular insurance policy may be included in only one affinity group.

Each affinity group may be indicative of a particular level of risk that is associated with the insurance policies included in the affinity group. That is, each insurance policy included in the affinity group may have the same or similar risk levels, or may fall within a common range of risk levels. The risk of a particular insurance policy may be determined, predicted, estimated, and/or quantified, for example, based upon a geographic location associated with the insurance policy, one or more characteristics of the property or asset covered by the insurance policy, one or more characteristics of the insured party under whose name or identity the insurance policy was issued and/or to whom compensation is to be given when loss or damage is incurred to insured items, one or more terms of the insurance policy, and/or other factors. Determining, predicting, estimating, and/or quantifying the risk of a particular insurance policy may be performed by any suitable technique, including actuarial techniques, underwriting techniques, machine learning techniques, and the like. For instance, the risk level of a particular insurance policy may be determined during the underwriting process of the policy.

In one embodiment, the dividing or segmenting of the multiple insurance policies into multiple affinity groups may be further based upon other factors and/or characteristics in addition to risk levels. The other factors and/or characteristics may include, for example, one or more preferences of the insurance provider, respective term lengths of the insurance policies, insureds' memberships in (or affiliations with) an organization, such as professional organization or association, a service or volunteer organization, business or company, etc., preferences of the insureds, and/or other types of factors and/or characteristics of the insurance policies and/or of the insureds.

In an exemplary implementation, dividing or segmenting the multiple insurance policies into multiple affinity groups based upon risk levels (and optionally, based upon one or more other factors/characteristics) may include accessing the insurance policy database 30 of FIG. 1 to determine the respective risk levels, factors, and/or characteristics of a plurality of insurance policies, and dividing or segmenting the plurality of insurance policies into multiple affinity groups based upon the determined risk levels, factors, and/or characteristics. For example, the policy grouping unit 22 of FIG. 1 may access the insurance policy database 30 to obtain information associated and/or indicative of multiple insurance policies and based upon which the policy grouping unit 22 performs the dividing or segmenting of the multiple insurance policies into the multiple affinity groups 402.

Subsequently, for each affinity group, the policy grouping unit 22 may store an indication of the affinity group, one or more indications of the particular insurance policies included in the affinity group, and/or one or more indications of the risk level (and optionally, the one or more other factors/characteristics) based upon which the affinity group was formed. For example, the policy grouping unit 22 may store one or more of said indications in the affinity group database 32.

The method 400 may include (e.g., via the one or more processors, computing devices or servers), creating a set of financial instruments corresponding to a particular affinity group, where the particular affinity group has a particular level of risk (block 405). Each financial instrument included in the set of financial instruments may be indicative of a respective assumption of risk for the particular affinity group over a particular time interval. Each financial instrument may be at least in part defined by a respective set of terms that govern an agreement between the insurance provider and an investing party (e.g., an investor). For example, the set of terms governing a financial instrument may define how profits and/or losses are to be distributed between the insurance provider and investing party, a length of maturity of the financial instrument, whether or not the financial instrument is renewable, any service fees, charges, and/or commissions, and the like. It is noted that not all of the financial instruments corresponding to a particular affinity group need to have the same governance terms. For example, the set of financial instruments corresponding to the particular affinity group may be divided into subsets of financial instruments, where each subset has a different set of governance terms.

Additionally, the method 400 may include, for a particular affinity group, procuring one or more parties for at least a portion of the set of financial instruments corresponding to the particular affinity group (block 408). In one implementation, the procurement unit 28 of FIG. 1 may procure one or more parties for at least the portion of the set of financial instruments corresponding to the particular affinity group. Typically, but not necessarily, the one or more parties may be procured as investors for the at least the portion of the set of financial instruments. In some embodiments, in addition or as an alternative to being investors, at least some of the one or more parties may be procured as administrators, servicers, and/or providers of the insurance policies included in the particular affinity group.

In one preferred (but non-limiting) embodiment, procuring the one or more parties for the at least the portion of the set of financial instruments corresponding to the particular affinity group includes conducting an online auction of the opportunity to invest in the at least the portion of the set of financial instruments corresponding to the particular affinity group. For example, from the set of financial instruments created for the particular affinity group, one or more of the set may be offered up for auction. The financial instruments offered for auction may include the entire set of financial instruments corresponding to the particular affinity group, or may include a subset of the entire set of financial instruments. Generally speaking, though, each of the offered financial instruments for a particular online auction may be subject to the same set of governing terms.

As such, the offered financial instruments may be presented to potential bidders (e.g., to at least some of the plurality of potential investors 18-1 to 18-M) via an electronic or online auction. For instance, the one or more processors, computing devices or servers may cause the offered financial instruments to be presented and/or offered for sale on remote display screens (such as via the internet or a secure communications network 20) of at least some of the potential investor computing devices 18-1 to 18-M. The offer may automatically provide information indicative of the particular affinity group with which the offered financial instruments are associated, such as the identity of the insurance provider 16, the risk level of the particular affinity group, the number of policies included in the particular affinity group and/or associated with the offered financial instrument, the types of insurance policies, other characteristics of the insurance policies, respective suggested terms of agreement for the offered financial instruments, etc., along with a request for a bid to invest in the offered financial instruments associated with the particular affinity group. (As previously discussed, though, no personal data or information of individual policyholders is included with the offer unless the owners of such personal data/information have given affirmative consent or permission to do so.)

Further, the offer may automatically indicate one or more criterion upon which bids are to be evaluated. One example of a bidding criterion may be a percentage of risk that a bidder or bidding party is willing to assume with respect to the offered financial instruments, where the winning bid(s) would include the highest percentage(s) of assumed risk. Another example of a bidding criterion is a percentage of profit that a bidder or bidding party is willing to accept with respect to the offered financial instruments, where the winning bid(s) would include the lowest profit percentage(s). Yet another example of bidding criteria is a percentage of loss that a bidder or bidding party is willing to incur with respect to the offered financial instruments, where the winning bids would include the one or more bidders who submitted the highest loss percentages.

Still another bidding criterion may be a fee, such as a service fee or commission, that a bidding party is willing to pay (e.g., to the insurance provider 16) for investing in the offered financial instruments, where the winning bid(s) would be indicate the highest fee(s). The fee may be a fixed fee or may be based upon a percentage of the premiums of the insurance policies associated with the offered financial instruments, in an example.

In some situations, a bidding criterion or bidding criteria indicated in the offer or request for bid may indicate a set of responsibilities (with respect to the insurance policies of the particular affinity group) that are to be assumed by the winning party, e.g., providing the insurance policies, administering, and/or servicing the insurance. For example, a request for bid may indicate that a winning party is to become the primary insurance provider of the insurance policies included in the particular affinity group. In another example, a request for bid may indicate that a winning party is to administer and/or service a portion of the affinity group's insurance policies (e.g., is to service a subset of the insurance policies included in the affinity group, and/or is to provide a subset of the administration and/or servicing activities for the insurance policies). In yet another example, a request for bid may indicate that a winning party is to administer and/or service at least a portion of the affinity group's insurance policies on behalf of the insurance provider, for example, under a contracting relationship and/or in a manner that is transparent to insured parties associated with the insurance policies.

Another example of bidding criteria may include the ability of a bidding party to qualify for the corresponding financial (and optionally, servicing) agreements. In an exemplary scenario, a bidding party may be required to include various types of professional, historical, and/or financial information (and/or references thereto) to demonstrate the party's ability to enter into any ensuing agreement. For example, the bidding party may submit various information (or references thereto), such as income, net worth, assets, outstanding debts, governance status, professional experience, etc. A bidding party may be required to submit at least some qualifying information with the party's bid, and may agree to submit additional qualifying information if the bidding party's bid is selected as the winning bid. In implementations in which a winning party is to assume at least a portion of the administration and/or servicing tasks of the affinity group's insurance policies (e.g., is to become the primary insurance provider for the policies, is to become a contractor that performs various tasks related to administering and servicing the policies, etc.), a bidding party may be required to demonstrate its ability to assume such responsibilities, e.g., by providing qualifying information in conjunction with its bid and/or when its bid is selected as a winning bid.

Of course, other bidding criteria are possible. The offer may indicate the particular one or more bidding criteria based upon which the auction will be conducted, and any relative weightings or priorities between the various criteria.

Subsequently, one or more of the potential investor computing devices 18-1 to 18-M may generate their respective bids based upon the offer information. Bids may be responsive to the indicated bidding criterion or criteria. In some instances, a bid submitted by a potential investor may also offer one or more suggested bidding criteria for the auction.

Procuring the one or more parties for the offered financial instruments (block 408) may include (e.g., via the one or more processors, computing devices or servers), receiving one or more bids submitted by one or more potential investor devices 18-1 through 18-M. The bids may be received by a processor or server associated with the entity running the auction (e.g., the procurement unit 28) via wireless or wired communication and/or data transmission, such as via the network 20. In one embodiment, each received bid may be sent to all others of the investor computing systems 18-1 through 18-M, and bidding may continue in an iterative fashion until auction termination criteria have been met (e.g., until a predetermined amount of time elapses, or until a predetermined amount of time since the last bid elapses, etc.).

Procuring the one or more parties for the offered financial instruments (block 408) may further include comparing and/or accepting one or more received bids in the online auction. For example, an accepted or winning bid or bids may be actively determined based upon direct comparisons of the one or more bidding criteria indicated in the offer and submitted in the bids of the bidding parties, or may be passively determined by accepting the most favorable submitted bid(s) when the auction termination criteria is met. The winning bidding party or parties may then be automatically entered into a binding contract for the financial instruments indicated by the accepted bids (which may be a subset of the set of financial instruments, or may be the entirety of the set of financial instruments), e.g., in accordance with the terms of the particular financial instruments corresponding to the winning bid(s), and thereby is invested in the financial instruments indicated by the accepted bids.

The computer-implemented method 400 may include (e.g., via one or more processors, computing devices, transceivers, and/or servers), upon expiration of the policy period associated with the financial instruments corresponding to the accepted bids, or at some other time after the policy period has expired, distributing at least a portion of the profit or loss which was generated over the time interval of the insurance policies whose risk is mitigated by said financial instruments, e.g., in accordance with the terms of the financial agreement. For example, if a profit was generated by the insurance policies over the time interval, a portion of said profit, e.g., as defined by the terms of the financial instruments, may be transferred to the investing parties. If a loss was generated by the insurance policies over the time interval, the investing parties may reimburse the insurance provider with a portion of said loss, e.g., as defined by the terms of financial instruments. Additional or alternative profit sharing and/or loss sharing techniques may be defined by the terms of the financial instruments and implemented, for example, increasing or decreasing shares of financial instruments owned by the investors, paying dividends to investors only when a particular rate of return is achieved, not requiring reimbursement for losses, etc. In one embodiment in which the winning bidding party assumes the role of primary insurance provider of the insurance policies, the winning bidding party may, e.g., per the terms of the agreement, realize the majority of the profit and/or loss of said policies over the policy period, while the auctioning party receives a fixed fee or a fixed percentage of revenue over the policy period.

It is noted that the profit and/or loss distribution need not occur immediately when the policy period expires, as determining the profit and/or loss associated with the policy period may take some time. It is envisioned that in some scenarios, laddering multiple financial instruments that expire at different times may help to smooth out cash flow. Other techniques to manage cash flow and/or other financial operations during the policy period (either for the provider and/or for the winning bidding party) may be possible and may be specified by the terms of the financial agreement. For example, if a significant catastrophe occurs prior to the expiration of the policy period, various terms of the financial agreement may specify how the responsibility for providing the payouts to affected insureds is to be divided between the provider and/or the winning bidding party (if at all), as well as how the effects of any intermediate payouts are to be accounted for in the profit/loss distribution after the policy period expires.

The computer-implemented method 400 may additionally or alternatively include one or more other actions to mitigate and/or manage insurance policy risk that are not illustrated in FIG. 3. For example, the method 400 may include subdividing a set of financial instruments that were created for a particular affinity group into different subsets of financial instruments, and automatically holding a different auction for each subset. The subdivisions may be based upon, for example, different sub-levels of risk within the level of risk of the particular affinity group, different expiration time intervals, and/or other differentiating criteria. The method 400 may include automatically renewing financial instruments that are near expiration, e.g., by automatically conducting another auction to renew the financial instruments under the same or similar terms as the expiring financial instruments, or under updated terms.

In one embodiment, the method 400 may include reforming at least one of the affinity groups, e.g., based upon updated risk levels and/or other factors or characteristics. For example, one of the affinity groups may be reformed after an updated risk analysis has been performed, after a group of insurance policies has expired, after a set of financial instruments has expired, or as desired.

Figure 4:
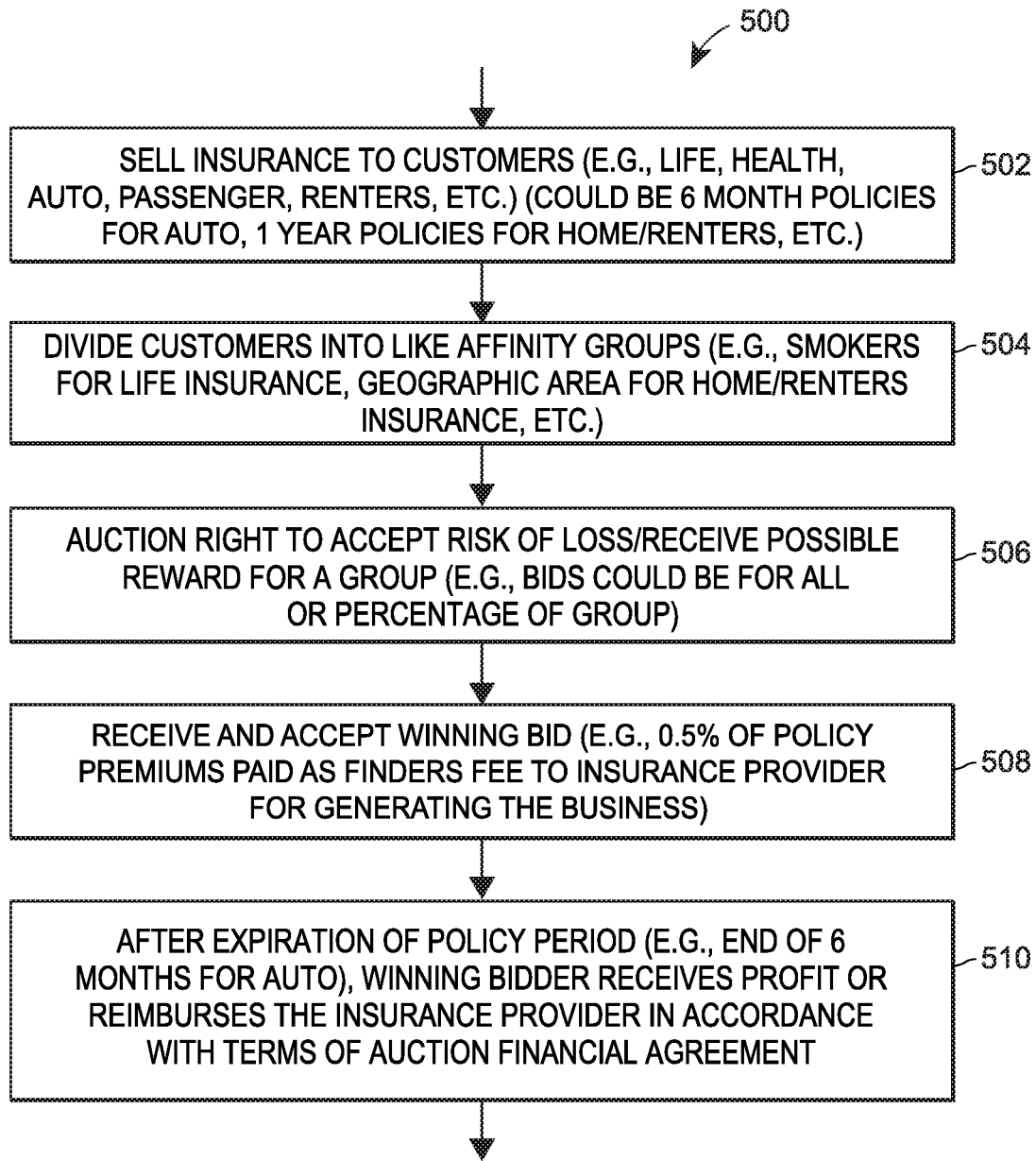
FIG. 4 depicts another exemplary computer-implemented method mitigating and/or managing the risk associated with insurance policies of an insurance provider.

FIG. 4 depicts another exemplary computer-implemented method mitigating and/or managing the risk associated with insurance policies of an insurance provider 500. The method 500 may include, via one or more processors, transceivers, servers, and/or other computing devices, (1) insurance providers selling insurance to customers, such as auto, homeowners, renters, life, health, pet, passenger, commercial, or other types of insurance (block 502). The insurance policies could be for varying periods, such as 6 months for auto insurance, or a year for homeowners insurance. The method 500 may include, via one or more processors, transceivers, servers, and/or other computing devices, (2) dividing like or similarly situated customers into groups or affinity groups (such grouping customers by life style for health insurance, or grouping homes by geographical area for homeowners) (block 504).

The method 500 of FIG. 4 may also include, via one or more processors, transceivers, servers, and/or other computing devices, (3) auctioning the right to accept the risk of loss and the right to receive potential profits associated with the insurance policies within an affinity group or other group of customers (block 506). The right to receive potential profits in return for assuming the risk of any losses for the affinity group's insurance policies may operate similar to stock option or commodity futures option, in some embodiments or respects. For instance, the bidders would be willing to receive a portion of the insurance premiums or profits, and in return be open to downside risk, such as if a major hurricane impacted an affinity group of homeowners policies, or an abnormal amount of claims were submitted for a given affinity group for various reasons. This may be akin to receiving an initial amount upfront while accepting substantial downside risk when selling a naked put option, such as selling an uncovered stock or commodity put option.

As discussed above, in some implementations, auctioning the right to accept the risk of profit/loss associated with the insurance policies may include auctioning the right to provide, administer, and/or service at least portions of the insurance policies. For example, the auction may indicate that a winning bidder is to become the primary insurance provider of the policies, is to provide at least a portion of the administering and/or the servicing of the policies during the policy period, and/or is to provide at least a portion of the administering and/or the servicing of the policies during the policy period without the insured parties' knowledge, e.g., as a contractor to the insurance provider. Accordingly, in these implementations, the insured parties may automatically receive the most competitively priced insurance coverage.

The method 500 of FIG. 4 may include, via one or more processors, transceivers, servers, and/or other computing devices, (4) receiving and accepting a winning bid for the right to assuming the risk and/or reward for an affinity group of insurance policies (block 508). For instance, a bidder may bid 0.2%, 0.5%, etc. of total policy premiums, which would be paid to the insurance provider servicing the policies as a finder's fee for generating the business. The method 500 of FIG. 4 may also include, via one or more processors, transceivers, servers, and/or other computing devices, (5) settling up after a policy period has expired (block 510). If the insurance policies within the affinity group were profitable, the insurance provider may transfer the amount of profit, minus the winning bid amount or finder's fee, to the winning bidder. If the insurance policies within the affinity group were not profitable, the winning bidder may transfer the amount of loss to insurance provider. Similar to FIG. 3, the profit and/or loss distribution need not occur immediately when the policy period expires, as determining the profit and/or loss may take some time. As a result, the insurance provider may be able to transfer risk associated with insurance policies to those interested in assuming the risk of loss in return for the right to any profits realized.

V. Additional Exemplary Computer-Implemented Methods

Figure 5:
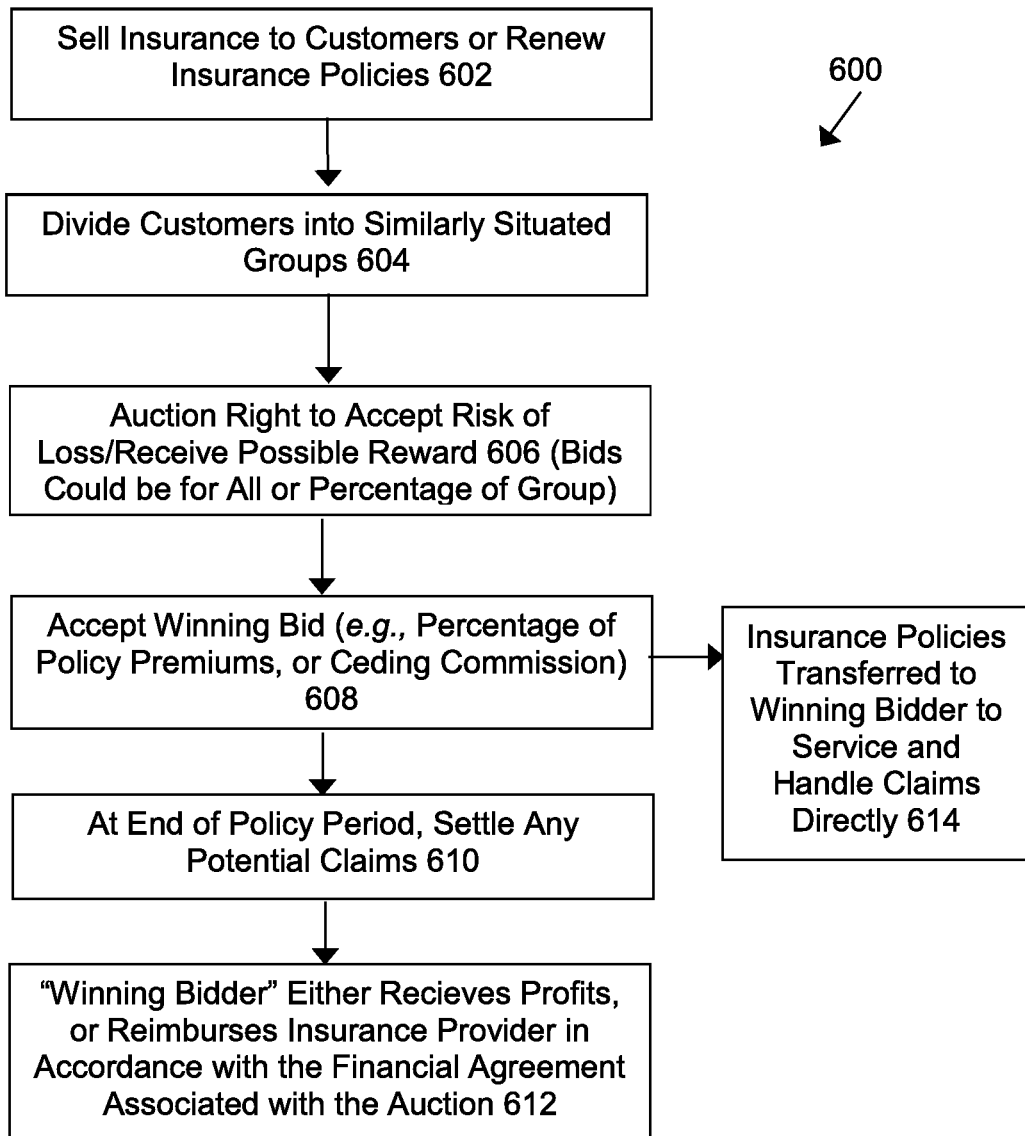
FIGS. 5 and 6 depict additional exemplary computer-implemented methods mitigating and/or managing the risk associated with insurance policies of an insurance provider.
Figure 6:
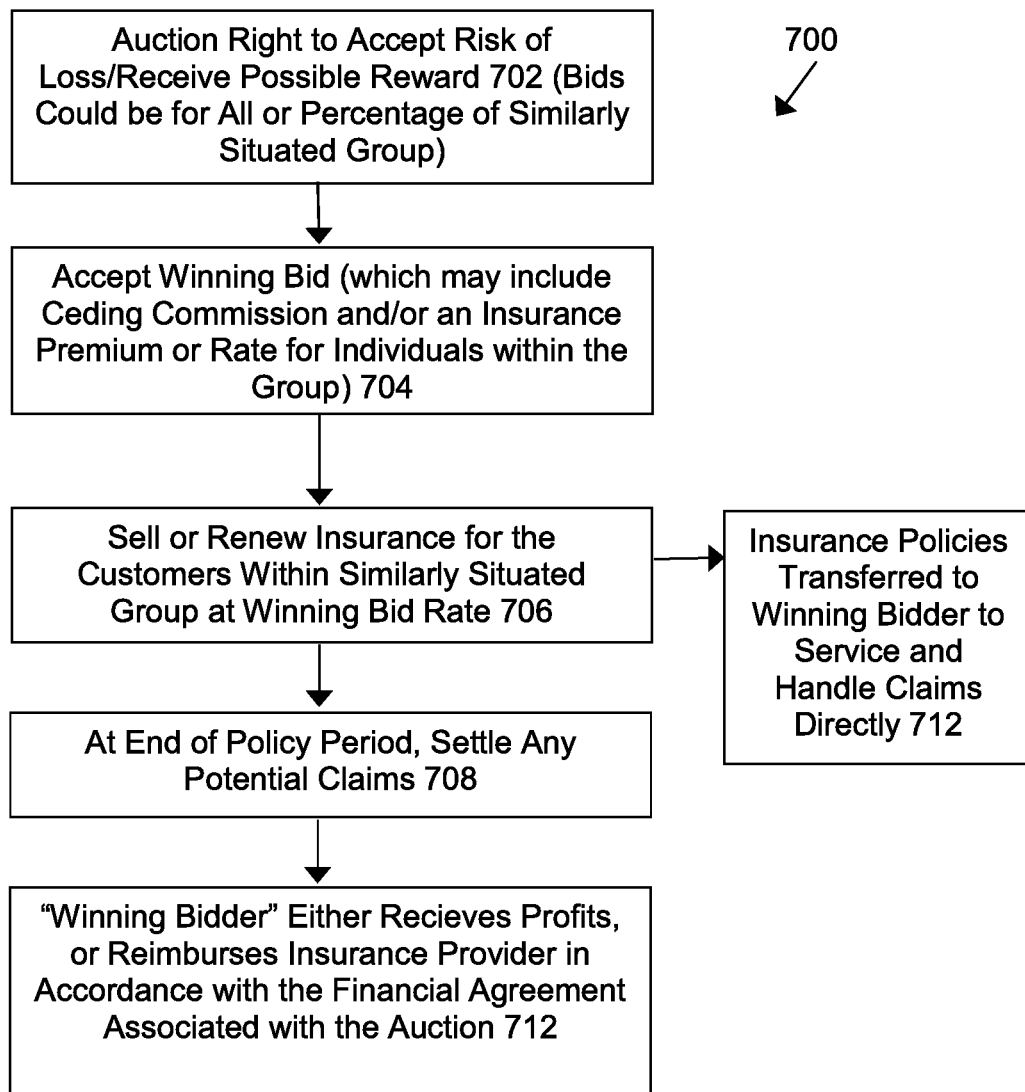

FIGS. 5 and 6 illustrates additional exemplary computer-implemented methods, e.g., for mitigating and/or managing the risk associated with insurance policies that are held by an insurance provider. In one embodiment, all or a portion of the methods 600 and 700 may be performed by the system 10 of FIG. 1 and/or by the computer system 300 of FIG. 2.

As shown in FIG. 5, the computer-implemented method 600 may include, via one or more processors, computing devices, transceivers, or servers associated with an insurance provider, auctioneer, or other entity: (1) selling insurance to customers and/or renewing insurance policies 602; (2) dividing the insurance customers into similarly situated groups 604; (3) auctioning the right to accept the risk of loss, or the possible profits for all, or a portion, of the group 606; (4) accepting a winning bid, which in some embodiments may be a percentage of the policy premiums or a ceding commission 608 (and/or vetting the financial creditworthiness of any bidders); (5) at the end of the policy period and even thereafter, settling or paying any potential claims 610; and/or (6) paying the winning bidder any profits realized by the group of insurance policies, or if a loss is incurred, being reimbursed by the winning bidder in accordance with a financial agreement that results from successful completion of the auction. In some embodiments, after the auction, the insurance policies may continue to be handled directly by the insurance provider. In other embodiments, the method 600 may include, after the auction, transferring the insurance policies within the group, or a percentage thereof, to the winning bidder such that the winning bidder may handle and service those policies directly 614. The method 600 may include additional, less, or alternate actions, including those discussed elsewhere herein.

As shown in FIG. 6, the computer-implemented method 700 may include, via one or more processors, computing devices, transceivers, or servers associated with an insurance provider, auctioneer, or other entity: (1) auctioning the right to accept the risk of loss, or the possible profits for all, or a portion, of a similarly situated group of insurance policies 702; (2) accepting a winning bid, which in some embodiments may be a percentage of the policy premiums or a ceding commission, and may include a premium or rate for individuals within the similarly situated group 704 (and/or vetting the financial creditworthiness of any bidders); (3) selling insurance to customers and/or renewing insurance policies within the similarly situated group 706 (in some embodiments, the winning bid may include a premium or rate that the individuals within the group are to be charged for the insurance provided); (4) at the end of the policy period and even thereafter, settling or paying any potential claims 708; and/or (5) paying the winning bidder any profits realized by the group of insurance policies, or if a loss is incurred, being reimbursed by the winning bidder in accordance with a financial agreement that results from successful completion of the auction. In some embodiments, after the auction, the insurance policies may continue to be handled directly by the insurance provider. In other embodiments, the method 700 may include, after the auction, transferring the insurance policies within the group, or a percentage thereof, to the winning bidder such that the winning bidder may handle and service those policies directly 712. The method 700 may include additional, less, or alternate actions, including those discussed elsewhere herein.

As noted elsewhere, the present embodiments may mitigate the risk for an insurance provider, as an alternative to traditional reinsurance. Additionally, in some aspects, the present embodiments make it easy for a customer to secure appropriate levels of insurance as the auctioning system may essentially perform the shopping for customers. The present embodiments may auction one or more insurance policies, including affinity groups of insurance policies (or blocks of similarly situated customers or insurance policies) to the lowest bidder, or the lowest bidder that is the most financially secure or provides the best customer service or claims experience. The "winning bidder" entity may then become the primary insurer, or alternatively, the winner bidder entity may be transparent to the consumer (such as provided for by a contract between the winner bidder and the auctioning insurance provider).

Referring back to FIG. 4, in one exemplary embodiment, the affinity group may be auto insurance policies in Harris County, Tex. The initial insurance provider desires to auction off 20% of the flood peril from July 1 to October 30 for existing insurance policies for which it has collected premiums for, such as during Steps 502 and 504. After which, at Step 506, the initial insurance provider holds the auction. Company A comes in with the winning bid at $5 million, at Step 508, and pays the initial insurance provider a finder's fee for the business.

After which, the initial insurance provider, rather than sending Company A the $5 million for assuming the risk, may keep all the insurance premiums until after the end of the policy period. If there has been no flood in Harris County, then the initial insurance provider would send Company A the $5 million on November 1, less the "finder's fee," which may be considered a ceding commission. On the other hand, if there has been a flood or other event, it may be some time until all the flood claims get reported and settled. Company A would be liable for 20% of the flood payments minus the $5 million. FIG. 4, step 510 shows this happening at the end of the policy period, but in reality in would be unknown at the end of the policy period and may take some time after the end of the policy period as may take months or even years to know the "profit or loss" from selling insurance policies. In this example, if the affinity group had a $100 million loss on auto insurance due to a flood in Harris County, Company's A share of the loss may be 20% of $100 million minus the $5 million bid, or $15 million.

VI. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of automatically obtaining and/or maintaining insurance coverage through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method, the method comprising:
   dividing or segmenting, via one or more processors of a securities provider executing functions of a policy grouping unit, and based upon risk levels, multiple insurance policies into multiple affinity groups, the multiple insurance policies held by an insurance provider;
   creating, by the one or more processors of the securities provider executing functions of an instrumentation unit, a set of financial instruments corresponding to a particular affinity group of the multiple affinity groups, the particular affinity group having a particular level of risk, and each financial instrument included in the set of financial instruments indicative of a respective assumption of risk for the particular affinity group over a time interval;
   procuring, by the one or more processors of the securities provider executing functions of a procurement unit, one or more other parties as investors in at least a portion of the set of financial instruments, thereby securitizing at least a portion of the particular level of risk associated with the insurance policies of the particular affinity group, wherein procuring the one or more parties as investors comprises:
      auctioning, via an electronic or communications network, an opportunity to invest in the at least the portion of the set of financial instruments, at least in part by causing computing devices of a plurality of potential investors to generate displays indicating the at least the portion of the set of financial instruments, wherein the plurality of potential investors includes the one or more other parties;
      receiving, via the electronic or communications network and from the computing devices of the plurality of potential investors, one or more bids for the opportunity to invest in the at least the portion of the set of financial instruments; and
      accepting at least one bid of the one or more received bids, the accepted at least one bid submitted by the one or more other parties; and
   distributing, by the one or more processors of the securities provider, at least a portion of profit or loss incurred by respective insurance policies included in the particular affinity group over the particular policy period to the one or more other parties in accordance with terms of the set of financial instruments.

2. The computer-implemented method of claim 1, wherein:
   accepting the at least one bid comprises accepting a particular bid based upon a percentage of the assumption of risk for the particular affinity group indicated by the particular bid; and
   wherein the set of terms of the set of financial instruments is established based upon the percentage of the assumption of risk for the particular affinity group indicated by the particular bid.

3. The computer-implemented method of claim 1, wherein:
   accepting the at least one bid comprises accepting a particular bid based upon at least one of a percentage of profit corresponding to the particular affinity group indicated by the particular bid or a percentage of loss corresponding to the particular affinity group indicated by the particular bid; and
   distributing the at least the portion of the profit or loss incurred by respective insurance policies included in the particular affinity group over the particular policy period to the one or more parties comprises distributing the at least the portion of the profit or loss based upon the percentage of profit corresponding to the particular affinity group or the percentage of loss corresponding to the particular affinity group indicated by the particular bid.

4. A system, comprising:
one or more persistent memories storing indications of multiple insurance policies held by an insurance provider;
one or more communication interfaces configured to communicate with remote devices via one or more electronic or communications networks;
one or more processors; and
one or more non-transitory, computer-readable media storing instructions that, when executed by the one or more processors, cause the system to:
  execute functions of a policy grouping unit that divides or segments, based upon risk levels, the multiple insurance policies into multiple affinity groups and store respective indications of the multiple affinity groups on the one or more persistent memories;
  execute functions of an instrumentation unit that creates a set of financial instruments corresponding to a particular affinity group of the multiple affinity groups and store respective indications of the set of financial instruments on the one or more persistent memories, the particular affinity group having a particular level of risk, and each financial instrument included in the set of financial instruments indicative of a respective assumption of risk for the particular affinity group over a particular policy period;
  execute functions of a procurement unit that procures, via the one or more communications interfaces and the one or more electronic communications networks, one or more other parties for at least a portion of the set of financial instruments, thereby securitizing at least a portion of the particular level of risk associated with the insurance policies included in the particular affinity group, wherein procuring the one or more parties as investors comprises:
    auctioning, via the electronic or communications network, an opportunity to invest in the at least the portion of the set of financial instruments, at least in part by causing computing devices of a plurality of potential investors to generate displays indicating the at least the portion of the set of financial instruments, wherein the plurality of potential investors includes the one or more other parties;
    receiving, via the electronic or communications network and from the computing devices of the plurality of potential investors, one or more bids for the opportunity to invest in the at least the portion of the set of financial instruments; and
    accepting at least one bid of the one or more received bids, the accepted at least one bid submitted by the one or more other parties; and
  distribute at least a portion of profit or loss incurred by respective insurance policies included in the particular affinity group over the particular policy period to the one or more parties in accordance with a set of terms of the set of financial instruments.

5. The system of claim 4, wherein:
the acceptance of the at least one bid is based upon a respective percentage of the assumption of risk for the particular affinity group indicated by each bid included in the at least one bid; and
the set of terms of the set of financial instruments is established based upon the respective percentages of the assumption of risk for the particular affinity group.

6. The system of claim 4, wherein:
the acceptance of the at least one bid is based upon at least one of a respective percentage of profit corresponding to the particular affinity group or a respective percentage of loss corresponding to the particular affinity group indicated by each bid included in the at least one bid; and
the distribution of the at least the portion of the profit or loss is based upon the at least one of the respective percentages of profit corresponding to the particular affinity group or the respective percentages of loss corresponding to the particular affinity group indicated by the each bid included in the at least one bid.

7. The system of claim 4, wherein, wherein the acceptance of the at least one bid is based upon a respective bid amount indicated by each bid included in the at least one bid, the respective bid amounts indicative of respective maximum fees that respective bidding parties are willing to pay for the opportunity to invest in the at least the portion of the set of financial instruments.

8. The system of claim 7, wherein the respective maximum fees are based upon respective maximum percentages of premiums of the respective insurance policies included in the particular affinity group.

9. The system of claim 4, wherein, wherein a particular party that submitted a respective accepted bid is qualified to invest in the at least the portion of the set of financial instruments.

10. The system of claim 4, wherein the multiple insurance policies provide insurance coverage for respective tangible, physical assets.

11. The system of claim 10, wherein the respective tangible, physical assets include at least one of a vehicle, a building, land, or another type of real property.

12. The system of claim 4, wherein the multiple affinity groups are formed based upon at least one of: a geographic location, one or more characteristics of respective real property covered by the multiple insurance policies, one or more characteristics of insured parties of the multiple insurance policies, or one or more policy terms of the multiple insurance policies.

13. The system of claim 4, wherein the distribution of the at least the portion of profit or loss incurred by respective insurance policies included in the particular affinity group over the particular policy period to the one or more parties comprises a transfer of at least some of the at least the portion of the profit incurred by the respective insurance policies over the particular policy period to the one or more parties.

14. The system of claim 4, wherein the distribution of the at least the portion of profit or loss incurred by respective insurance policies included in the particular affinity group over the particular policy period to the one or more parties comprises a reception of a reimbursement from the one or more parties, the reimbursement determined based upon at least some of the at least the portion of loss incurred by the respective insurance policies over the particular policy period.

15. The system of claim 4, wherein at least a portion of the system is a block-chain system.

16. The system of claim 4, wherein the system is owned and/or operated by a securities provider.

17. The system of claim 4, wherein the procurement of the one or parties for the at least the portion of the set of financial instruments comprises:

an auction of an opportunity to be at least one of a provider, an administrator, and/or a servicer of the insurance policies included in the particular affinity group;

respective receptions, via the one or more communication interfaces, of one or more bids for the opportunity to be the at least one of the provider, the administrator, and/or the servicer of the insurance policies included in the particular affinity group; and an acceptance, by the one or more processors, of at least one bid of the one or more received bids for the opportunity to be the at least one of the provider, the administrator, and/or the servicer of the insurance policies included in the particular affinity group, the accepted at least one bid submitted by the one or more other parties.

18. The system of claim 17, wherein a first particular party that submitted a respective accepted bid is granted the opportunity to be at least one of the administrator and/or the servicer of at least a portion of the insurance policies included in the particular affinity group.

19. The system of claim 18, wherein the first particular party is granted the opportunity to at least one of administrate and/or service the at least the portion of the insurance policies included in the particular affinity group in a manner transparent to the insured parties of the at least the portion of the insurance policies included in the particular affinity group.

20. The system of claim 17, wherein a second particular party of the one or more parties is granted the opportunity to be the primary insurance provider of the insurance policies included in the particular affinity group.

* * * * *